United States Patent
Wilson et al.

(10) Patent No.: US 7,411,756 B2
(45) Date of Patent: Aug. 12, 2008

(54) METHOD AND APPARATUS FOR WRITE HEAD DEMAGNETIZATION

(75) Inventors: Ross Schwensen Wilson, Menlo Park, CA (US); Carl F. Elliott, Eden Prairie, MN (US)

(73) Assignee: Agere Systems, Inc., Allentown, PA (US)

( * ) Notice: Subject to any disclaimer, the term of this patent is extended or adjusted under 35 U.S.C. 154(b) by 292 days.

(21) Appl. No.: 11/052,008

(22) Filed: Feb. 4, 2005

(65) Prior Publication Data

US 2005/0190476 A1    Sep. 1, 2005

Related U.S. Application Data

(60) Provisional application No. 60/542,563, filed on Feb. 6, 2004.

(51) Int. Cl.
G11B 5/03    (2006.01)
G11B 5/09    (2006.01)

(52) U.S. Cl. .......................... 360/66; 360/46

(58) Field of Classification Search ....................... None
See application file for complete search history.

(56) References Cited

U.S. PATENT DOCUMENTS

| | | | | |
|---|---|---|---|---|
| 4,970,621 A * | 11/1990 | Gailbreath et al. | ........... | 361/149 |
| 5,168,395 A * | 12/1992 | Klaassen et al. | .............. | 360/46 |
| 7,088,537 B2 * | 8/2006 | Cronch et al. | ................. | 360/66 |
| 7,092,186 B1 * | 8/2006 | Hogg | .......................... | 360/60 |
| 7,106,536 B2 * | 9/2006 | Fang et al. | .................... | 360/67 |

* cited by examiner

*Primary Examiner*—Andrea Wellington
*Assistant Examiner*—Dan I Davidson
(74) *Attorney, Agent, or Firm*—Priest & Goldstein, PLLC

(57) ABSTRACT

An apparatus and method for demagnetizing a write head of a disc drive. Under control of a clock oscillator, synthetic demagnetizing pulses are generated and applied to a writer-driver bridge. Also under control of the clock oscillator, a write current produced by the writer-driver bridge incorporates the demagnetizing pulses and ramps down to about zero. The train of demagnetizing pulses and the write current ramp down demagnetizes the head, reducing write head magnetic bias that may influence the proximate read head of the disc drive head.

49 Claims, 10 Drawing Sheets

METHOD AND APPARATUS FOR WRITE HEAD DEMAGNETIZATION

The present application claims the benefit under Section 119(e) of the provisional application filed on Feb. 6, 2004 and assigned application No. 60/542,563.

FIELD OF THE INVENTION

The present invention relates to hard disc drives and other mass storage media employing a magnetic head to read data from and write data to the media, and more particularly to a method and apparatus for demagnetizing the head.

BACKGROUND OF THE INVENTION

A disc drive storage system 10, illustrated in FIG. 1, comprises a disc 12 further comprising a magnetic material for storing information in the form of binary bits for later retrieval and processing by a computer or processing device. Information is written to the disc 12 by magnetizing magnetic domains within the magnetic material to represent a binary zero or a binary one. The domains retain the magnetization for later retrieval during a disc read operation.

A spindle motor 13 rotates the disc 12 (typically at speeds up to 10,000 revolutions per minute) allowing a read/write head 14 to write or read data as the read/write head 14 flies over an upper surface of the disc 12. The read/write head 14 is affixed to an actuator and suspension arm 16 controlled by a voice coil motor 18 for moving the suspension arm 16 across the upper surface of the disc 12 along an arc extending between a disc circumference 24 and a hub 26. The physical features of the suspension arm 16 cause the read/write head 14 to 'fly' very close to the disc upper surface, as head-to-disc contact is undesired.

Certain head embodiments conventionally comprise two separate transducing elements (not shown in FIG. 1), an inductive writer and a magnetoresistive (MR) reader. Earlier-generation heads utilize a single inductive transducer for both reading and writing. The present application, in the interest of clarity, assumes use of a dual-element head, however the invention is not limited in application to a dual-element head embodiment.

The disc 12 comprises a plurality of concentric tracks 30 (typically 20,000 per radial inch) for interlaced storage of binary-encoded user data in fields 32 and head location data in servo bursts 34. The servo bursts 34 (typically 200 per disc track), which are radially contiguous across the disc 12 and equally-spaced circumferentially along each track, provide feedback information to the read/write head 14 for accurately controlling head position along the track (referred to as track following) and for moving the read/write head 14 rapidly and accurately between tracks (referred to as track accessing).

To write data to the disc 12, the voice coil motor 18 moves the suspension arm 16 to a desired radial position above the surface of the disc 12. The disc 12 is rotated to move a circumferential region to be written under the read/write head 14. Write current is supplied to a coil (magnetically coupled to a magnetically permeable core) of the head's inductive writer to induce a magnetic field in the core. The magnetic field extends from the core across an air gap between the read/write head 14 and the disc 12 to magnetize a small region of magnetic domains to store the data bit. The direction of the magnetic field produced by the head, and thus the direction of the magnetic domains, is dependent on the direction of current flow through the head.

During a data read or a servo read operation, the suspension arm 16 is moved while the disc 12 is rotated to position the read/write head 14 above a magnetized region to be read. A DC (direct current) bias voltage of 0 volts to about 0.3V is supplied to the read/write head 14. The magnetized disc region changes a resistance of the magnetoresistive element in the read/write head 14, generating an output signal comprising a relatively small AC (alternating current) voltage imposed on the DC bias voltage.

The output signal is supplied to a read circuit 40A of a preamplifier 40. From the read circuit 40A, servo data is supplied to a servo read circuit 42A of a recording channel 42; read data bits are supplied to a data read circuit 42B. The servo read operations are interlaced with either a data read or a data write operation, as the servo feedback information is required during both operations to maintain proper position of the read/write head 14. Due to the low signal levels and high-frequency components in the read output signal, the preamplifier 40 is conventionally mounted proximate the read/write head 14, commonly on a circuit board constructed from flexible material.

As is conventional in the art, the preamplifier 40 further comprises a serial port configuration control register 40C that communicates with a controller 54 over a conductor 41 for providing control signals to the configuration control register 40C for establishing operating parameters of the preamplifier 40.

A servo logic circuit 50 receives processed and demodulated servo data from the servo read circuit 42A and translates this information into a format acceptable to a servo DSP (digital signal processing) processor 52 that executes servo control algorithms to control head position and movement according to head location commands received from the controller 54. Control commands supplied by the servo DSP processor 52 are delivered to a voice coil motor power amplifier 56 that in turn controls the voice coil motor 18 to drive the read/write head 14 in a closed feedback loop to maintain the desired head position on the disc 12. A spindle motor power amplifier 57 receives command signals from the servo DSP processor 52 to maintain the spindle speed at typically about 10,000 RPM.

During data read operations, the data read circuit 42B of the recording channel 42 delivers read data to the controller 54 over a buss 62. The controller 54 performs error detection and correction on the read data prior to supplying the data to a user interface, such as an interface to a computer or data processing device (e.g., SATA, SCSI, SAS, PCMCIA interfaces).

To write data to the disc 12, the controller 54 receives data to be written from the user interface for formatting and adding error detection/correction information. The processed data are supplied over a buss 64 to a data write circuit 42C of the recording channel 42. A write gate signal is also supplied by the controller 54 to the data write circuit 42C; from the data write circuit 42C the write gate signal is supplied to the write circuit 40B of the preamplifier 40. The data write circuit 42C also provides a write data signal, that represents the data bits to be written to the disc 12, to the data write circuit 40B. When the write gate signal is asserted, the preamplifier 40 is activated for write mode operation, during which the write circuit 40B causes current supplied to the write element of the read/write head 14 to alternate (i.e., change direction) under influence of the write data signal (representing the data bits to be written to the disc 12) between a positive state (to write a '1', for example) and a negative state (to write a '0', for example). The write current magnetizes the disc 12 to store the data bits. As is known by those skilled in the art, the designation of a positive state as a data '1' and a negative state as a data '0' is arbitrary and can be reversed. As will be described below, deassertion of the write gate signal initiates the demagnetize function according to the teachings of the present invention.

The recording channel 42 further comprises a servo-write circuit 42D that in response to signals received from the servo DSP processor 52, generates servo information for writing onto the disc 12 via the preamplifier write circuit 40B. The servo write circuit 42D is typically active only during manufacture of the disc drive to write servo information 34 on the disc 12.

To increase storage capacity, a disc drive may comprise a plurality of stacked parallel discs 12. A read/write head is associated with each disc to write data to and read user data and servo data from a top and bottom surface of each disc.

Ideally, upon conclusion of a write operation, the inductive write element of the read/write head 14 should not influence the head's MR read element during a subsequent read operation. In practice, however, if the write current in the write element ceases abruptly at the end of a write operation, the inductive writer tends to retain remnant magnetization within its ferromagnetic core, thus creating a residual magnetic field. Due to the proximate location of the MR read element and the inductive write element within the read/write head 14, the remnant magnetization can undesirably bias the read element, possibly distorting the read signal and causing errors in read bits. Demagnetizing (degaussing) the write element after a write operation reduces the remnant magnetization.

A further motivation for demagnetizing the write element is the need to avoid data erasure from the disk 12 by stray magnetic fields. In modern high-density recording, the small bit-cell sizes in the disc 12 are susceptible to thermal agitation. Over many revolutions of the disc, the presence of the residual field within the write element can hasten collapse of the bit-cell magnetization, causing data loss.

To reduce the remnant magnetization, it is desired to demagnetize the inductive writer of the read/write head 14 after a data write operation. This process, also referred to as degaussing, is accomplished by repetitively alternating the head current polarity, causing the inductive write element to switch between a north and a south magnetic pole, while decaying the head current to zero. The switching is accomplished by applying a series of bursts or transitions having a duration T (where T=1/(data frequency)) to the inductive write element. Switching the current direction in a controlled manner over a predefined number of magnetic pole transitions and decaying the head current from its full value (i.e., the current value during a write operation) to zero during the transitions causes the write element to execute successively smaller loops of its MH curve (i.e., the hysteresis curve relating the magnetic field (H) to the magnetization (M)), causing the remnant magnetization to decay to nearly zero. In its effect on the core domain structure of the writer head, the degauss process is analogous to an annealing operation.

Possible implementations of the demagnetizing operation include an analog approach using programmable analog time constants (i.e., time constants derived from resistor/capacitor (RC) components or current-charged capacitors) to provide the head current ramp down. Such an approach requires a synchronizing element to synchronize the current ramp down interval with the bursts or transitions, and is therefore sensitive to on-chip component values that determine the analog time constants. Known degaussing implementations are also limited in their ability to provide an arbitrary shape to the decay profile of the write current during the ramp down interval.

SUMMARY OF THE INVENTION

In one embodiment, the present invention comprises an apparatus for demagnetizing a disc drive head, comprising, an oscillator for producing pulses, an element for determining a demagnetizing interval length, a current source for producing demagnetizing current in response to the count value, wherein the demagnetizing current decreases with time, and wherein the pulses modulate the demagnetizing current to demagnetize the head.

According to another embodiment, the invention comprises a method for demagnetizing a write head of a magnetic data storage system, comprising producing demagnetizing pulses synchronized to data pulses for writing data bits to the magnetic storage system, converting a digital value representing a length of the demagnetizing interval to a control signal, producing a demagnetizing current in response to the control signal, wherein the demagnetizing current decreases with time, modulating the demagnetizing current by the demagnetizing pulses and supplying the modulated demagnetizing current to the write head to demagnetize the write head.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
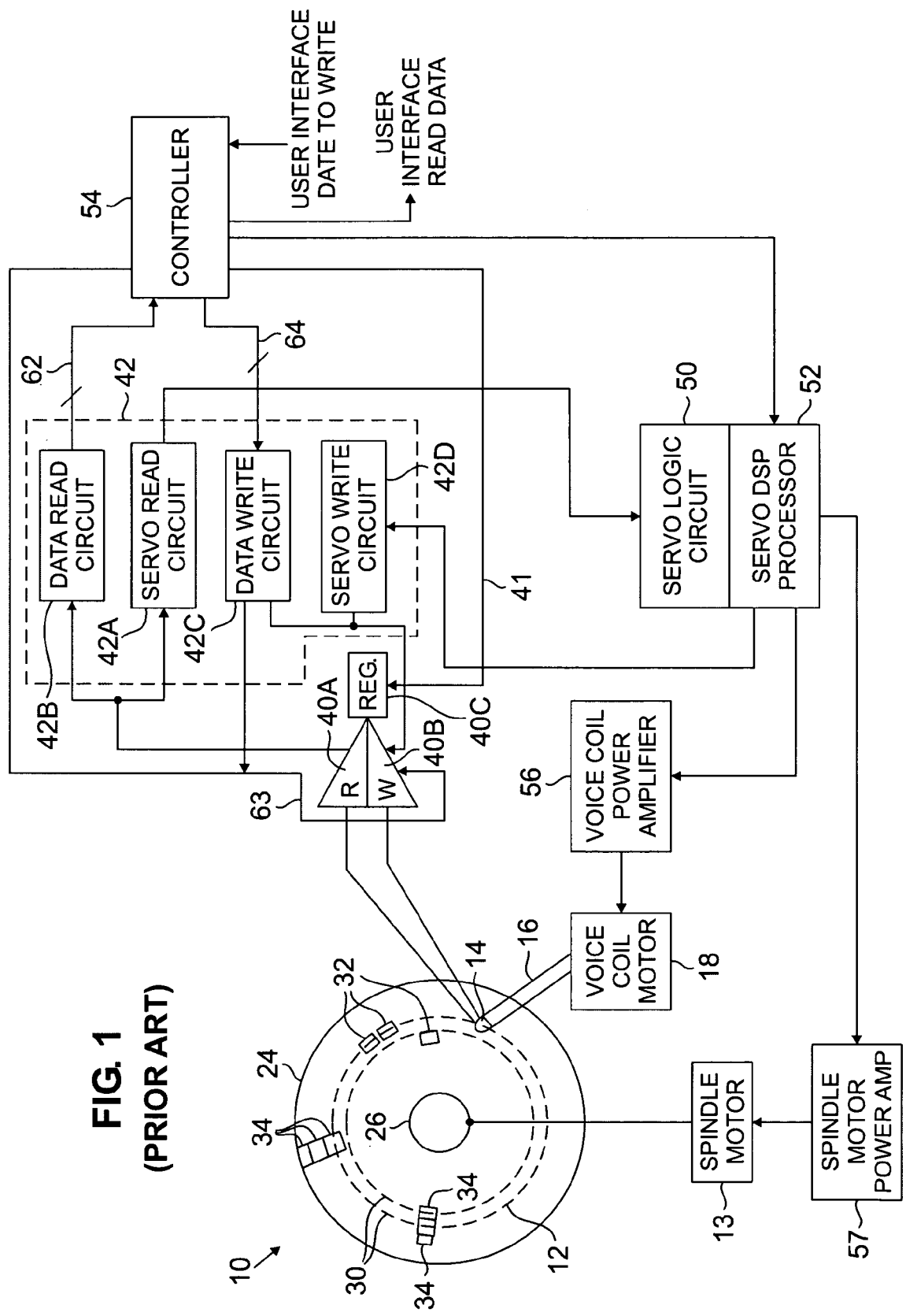
FIG. 1 illustrates a prior art disc drive storage system to which the teachings of the present invention can be applied.

Before describing in detail the particular method and apparatus for demagnetizing a read/write disc drive head, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention. Two preferred embodiments are described, one suitable for use with moderate-speed all-CMOS disc drive writer circuits and a second suitable for use with high-performance BiCMOS writer circuits.

The present invention teaches embodiments of a write head demagnetizing apparatus and method for use in a computer or data processor disc drive or other magnetic-based recording medium. In the presented embodiments as applied to a computer disc drive, the demagnetizing apparatus is preferably incorporated into the write circuit 40B (see FIG. 1) of the disc drive preamplifier 40, to degauss or demagnetize the read/write head 14 after a data write operation. Demagnetization is accomplished by ramping the write current supplied to the write circuit 40B to about zero while supplying a high-frequency tone (a series of demagnetizing pulses) to the write circuit 40B.

The present invention further teaches a digital demagnetizing approach, using a shift register (in one embodiment) and a clock oscillator to synchronize the various demagnetization timing functions. Such a digital implementation is suitable for efficient realization in CMOS and BiCMOS integrated circuits where the cost of logic functionality is relatively low, compared with the resistor/capacitor analog time constant demagnetizing implementations of the prior art. As the present invention is predominately digital in nature, it is insensitive to integrated circuit process tolerances and temperature induced component value drifts. In comparison, the analog approach relies on resistor-capacitor time constants and thus is sensitive to the fabricated resistor and capacitor component values.

Additionally, the digital nature of the present invention simplifies synchronization of the demagnetizing pulses with the recording channel 42 (FIG. 1) in an embodiment where the recording channel 42 supplies write data pulses during the demagnetizing interval. In such an embodiment, the clock oscillator as described further below is not required.

Advantageously, a clock oscillator of the present degaussing apparatus can be operated at a relatively low frequency (a frequency of ½T or a clock period of 2T), while providing a time resolution T for the demagnetizing operation i.e., where T is one-half the clock period or twice the clock frequency and refers to a width of the demagnetizing pulses inserted into the write current during the demagnetizing operation. The invention thus enjoys the reduced power consumption and design simplicity advantages of running a clock at a lower speed (i.e., ½T), while providing a desired (higher) time resolution (i.e., T) for the pulses inserted during the demagnetizing operation.

The demagnetizing apparatus of the present invention n is suitable for use with a variety of disc drive designs. The apparatus is also capable of providing various write current decay profiles (the write current ramp down) during the demagnetizing interval. The write decay profile can be fixed when the demagnetizing apparatus is designed or modified later through user programmable registers that permit the user to generate a desired decay profile by selecting decay waveform features.

Figure 2:
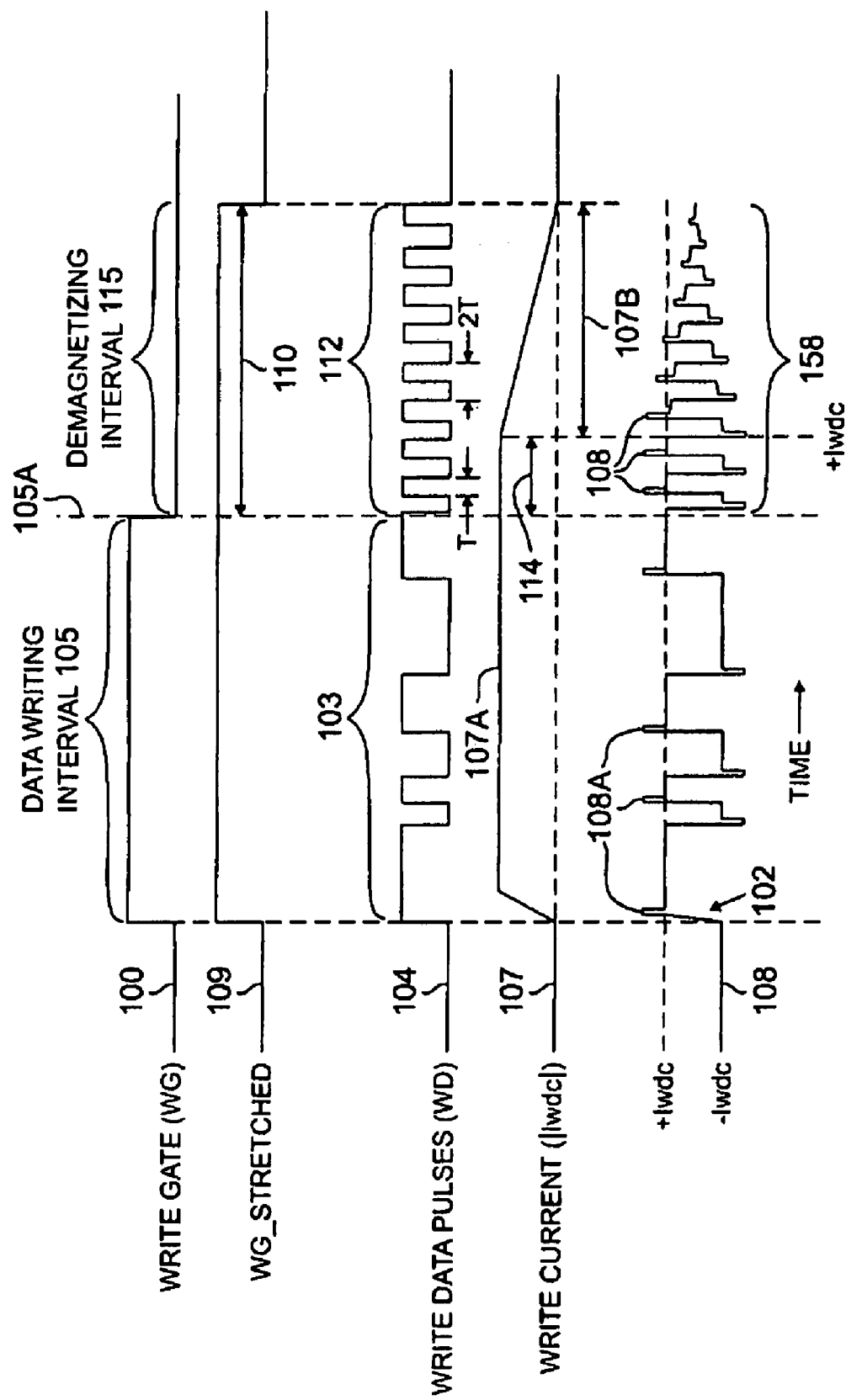
FIG. 2 illustrates signal waveforms associated with the demagnetizing method and apparatus of the present invention.

FIG. 2 illustrates several waveforms that are relevant to the head demagnetizing process of the present invention. The write gate signal (WG) 100, when asserted high at a time 102, commands the write circuit 40B in the preamplifier 40 to activate the inductive writer of the read/write head 14 for writing write data pulses 103 in a write data (WD) signal 104 during a data writing interval 105. Deassertion of the write gate signal 100 (i.e., return to a low state in the illustrated embodiment) at a high-to-low transition 105A ends the data writing interval 105.

To write data pulses to the disc 12 during the data writing interval 105, write current is supplied to the read/write head 14. A write current magnitude |Iwdc| 107 and a modulated write current 108, i.e., modulated by write data pulses 103 or synthetic demagnetizing pulses 112, are illustrated in FIG. 2. In the exemplary embodiment of FIG. 2, the modulated write current 108 comprises a −Iwdc value to write a zero bit and a +Iwdc value to write a one bit. As illustrated, each of the pulses comprising the write current 108 further comprises an overshot pulse 108A, during which the write current is increased to an overshot value to reduce the current rise time in the read/write head 14.

The normal data-writing operation ends at the high-to-low transition 105A in the write gate signal 100, marking an end of the data writing interval 105 and a beginning of a demagnetizing interval 115. The waveforms operative during the demagnetizing interval 115 as illustrated in FIG. 2 are described below.

Throughout the description of the present invention, the phrase, 'high' signal value is used interchangeably with a 'true' or an 'asserted' state. Those skilled in the art recognize that other signal values can also be associated with a 'true' or an 'asserted' logic state.

The write gate signal 100, the write data (WD) signal 104, a write gate stretched signal 109, the write current magnitude 107 (|Iwdc|) and the modulated write current 108 are related to the demagnetizing function of the present invention as follows. The write gate stretched signal 109 goes high coincident with the write gate signal 100 at the time 102. The write gate stretched signal 109 holds the preamplifier write circuit 40B in the write state throughout the demagnetizing interval 115, i.e., after deassertion of the write gate signal 100 at the high-to-low transition 105A.

Logic of the present invention, to be described below, senses the write gate (WG) high-to-low transition 105A and in response retains a high signal level in the write gate stretched signal 109 for a duration 110, i.e., during the demagnetizing interval 115. During the write gate stretched or demagnetizing interval 115, synthesized demagnetizing pulses 112 (in one embodiment a duration of each pulse half cycle is T) are formed in the write data (WD) signal 104 and carried on the conductor 63 (see FIG. 1) from the data write circuit 42C to the preamplifier write circuit 40B. (Conversely, during the data writing interval 105 the data pulses 103 are carried over the conductor 63.) As can be seen from FIG. 2, during the demagnetizing interval 115 the modulated write current 108 includes the synthesized demagnetizing pulses 112 and is ramped down from a value 107A (typically the current magnitude |Iwdc| for writing data on the disc 12) to about zero during a ramp down interval 107B. Although FIG. 2 depicts a linear ramp down, in other embodiments a non-linear ramp down, e.g., an exponential or parabolic ramp down, can be generated as explained below.

To reduce the power consumed by the demagnetizing circuits, voltage/current bias-providing elements of the demagnetizing circuits are preferably activated only during the demagnetizing interval 115. Since the bias-providing elements are energized at the transition 105A, a delay interval 114 between the fall of the write gate signal 100 at the transition 105A and the beginning of the ramp down interval 107B) provides adequate time for the bias-providing elements to settle to a steady-state voltage/current. If the delay interval 114 is undesirable, e.g., for reasons related to drive formatting efficiency, in another embodiment the delay interval 114 is eliminated, preferably by energizing the bias-providing elements and the demagnetizing circuits at the time 102, when the write gate signal 100 goes high, thereby avoiding the need for a settling time at the start of the demagnetizing interval 115.

Figure 3:
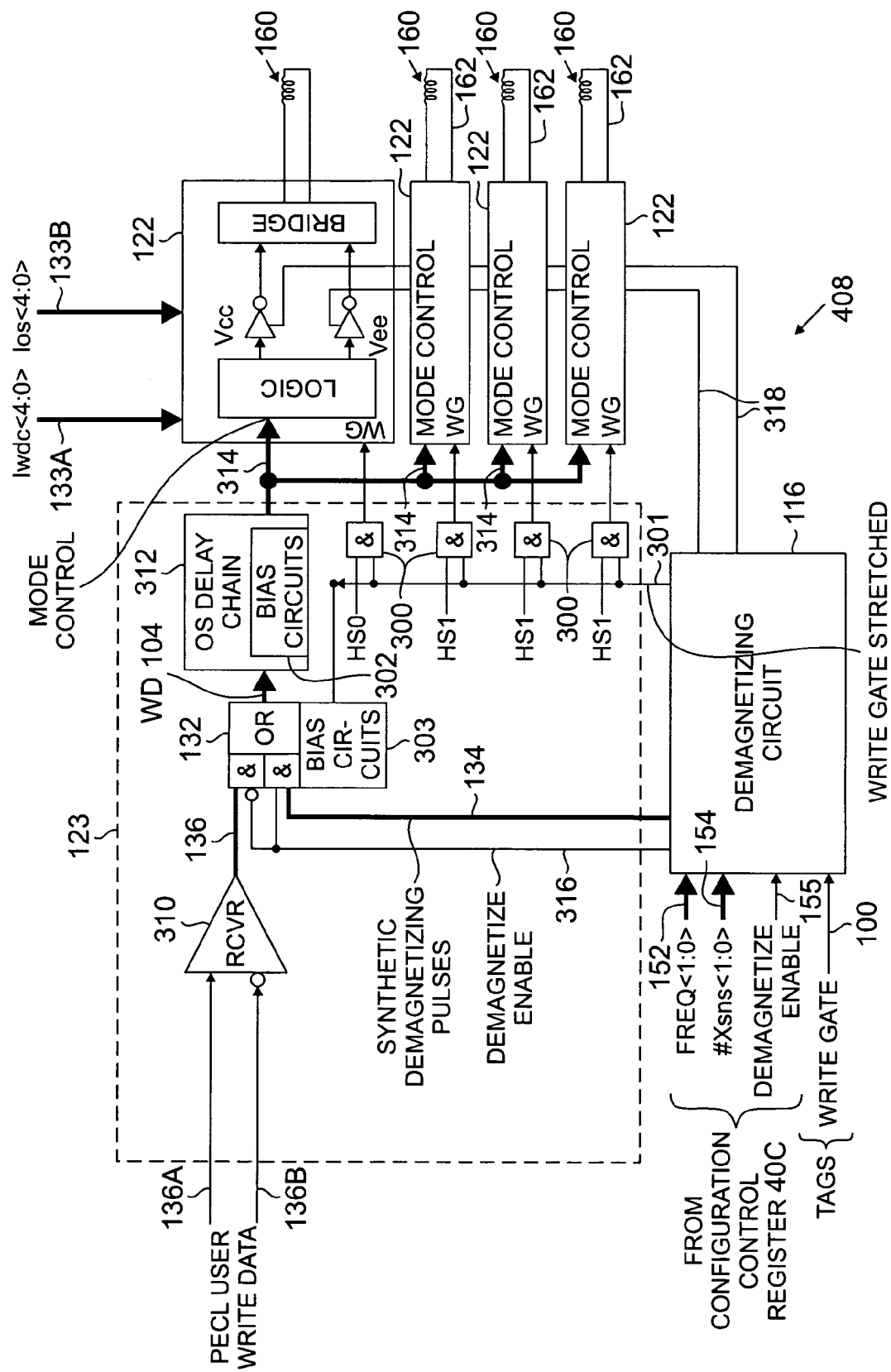
FIG. 3 illustrates a demagnetizing apparatus of the present invention and related components for a disc drive head.

FIG. 3 illustrates the preamplifier write circuit 40B comprising a demagnetizing circuit 116 and a low-level logic circuit 123, both preferably disposed within the preamplifier 40 of FIG. 1, for supplying signals to head-dedicated writer-driver bridges 122 (i.e., one writer-driver bridge for each disc drive head) also disposed within the preamplifier write circuit block 40B. One writer-driver bridge 122 supplies write current to one head, i.e., to one inductive writer 160 in a read/write head 14. In a multi-head disc drive, the writer-driver bridge 122 is replicated N-fold (where N=4 in the FIG. 3 embodiment) to supply write current to N heads 14.

The low-level logic circuit 123, which is common to each one of the plurality of head-dedicated write-driver bridges 122, comprises logic elements operative during the data writing process and during the demagnetizing process according to the present invention. The demagnetizing circuit 116 supplies demagnetizing signals to each of the N head-dedicated writer-driver bridges 122. According to another embodiment, the demagnetizing circuit 116 and the low-level logic circuit 123 are operative with a single writer-driver bridge 122 that supplies current to a single inductive writer 160 in a single-head disc drive.

Current sources within the writer-driver bridge 122 (to be described further below) generate the write current supplied to the inductive writer 160 during data writing and demagnetizing operations. In one embodiment, each writer-driver bridge 122 comprises a conventional writer H-bridge, with current sources in first opposing legs of the bridge supplying current in a first direction through the inductive writer 160, and current sources in second opposing legs of the bridge supplying current in a second direction through the inductive writer 60. Write current amplitude is controlled by two current reference values supplied to the writer-driver bridge 122: a steady state DC write current amplitude reference value Iwdc<4:0> supplied on a buss 133A, and an overshoot write current amplitude reference value Ios<4:0> supplied on a buss 133B. The nomenclature <4:0> indicates that the associated value comprises five bits designated bits 0-4. The present invention is not limited to reference values having a specified number of bits.

The value Ios<4:0> specifies a current value for overdriving a transmission line 162 connecting the writer-driver bridge 122 and the inductive writer 160, by momentarily raising the write current above its steady-state value to improve current rise time in the inductive writer 160. Preferably, a duration of the overshoot is less than a minimum time T. The pulses 108A in FIG. 2 illustrate the current for over-driving (overshooting) the inductive writer 160.

Both the steady state DC write current amplitude reference value and the overshoot write current amplitude reference value originate in the configuration control register 40C of the preamplifier 40, as selected by the user.

Two busses (each typically comprising a two-bit buss) 152 and 154, also originating in the configuration control register 40C of the preamplifier 40 (see FIG. 1), provide reference or condition-setting values Freq<1:0> and #Xsns<1:0> to the demagnetizing circuit 116 for establishing characteristics of the demagnetizing waveforms of FIG. 2. The Freq<1:0> and #Xsns<1:0> values set certain demagnetization parameters, as further described below, but do not of themselves initiate the demagnetization process.

The Freq<1:0> value on the buss 152 determines the frequency of the synthetic demagnetizing pulses 112 of FIG. 2 (also referred to as synthetic pulses), wherein the frequency is designated ½T. The pulse width is determinable from the pulse frequency. In one embodiment, a length of the demagnetizing interval 115 (see FIG. 2) is specified as a number of demagnetizing transitions or pulses. In this embodiment, the value #Xsns<1:0> specifies a number of synthetic pulses to be inserted during the write current ramp down interval 107B, and hence the duration of the demagnetizing interval, since the pulse duration is specified by the Freq<1:0> value.

A user-specified demagnetize enable signal, which also originates in the configuration control register 40C of the preamplifier 40, is supplied to the demagnetizing circuit 116 over a conductor 155. User assertion of the enable signal enables demagnetizing of the read/write head 14 after a data write operation. User deassertion of the signal disables the head demagnetizing process.

In response to the high-to-low transition 105A (see FIG. 2) in the write gate signal 100, the demagnetizing circuit 116 produces the synthetic demagnetizing pulses 112 (see FIG. 2), which are supplied as an input to a multiplexer 132 within the low-level logic circuit 123 via a buss conductor 134.

The low-level logic circuit 123 receives differential user data on conductors 136A and 136B for writing to the disc 12. These data are received by a PECL (positive emitter-coupled logic) receiver 310 and supplied to the multiplexer 132 over a conductor 136. The demagnetize enable signal is supplied to the multiplexer 132 on a conductor 316 from the demagnetizing circuit 116. The output signal of the multiplexer 132 comprises the write data (WD) signal 104 (see FIG. 2) augmented by the user data pulses 103 (supplied on the buss conductor 136) to be written to the disc 12 by the inductive writer 160 during the data writing interval 105. Alternatively, the output signal of the multiplexer 132 comprises the write data signal 104 augmented by the synthetic demagnetizing pulses 112 (supplied on the buss conductor 134) for demagnetizing the inductive writer 160 during the demagnetizing interval 115.

The write data (WD) signal 104 from the multiplexer 132 is supplied to a differential delay and overshoot pulse-generation element 312 (also referred to as the overshoot (OS) delay chain) to generate mode control signals that are supplied, in common, to a mode control terminal of each of the writer-driver bridges 122 over a buss 314. A differential delay mechanism in the differential delay and overshoot pulse-generation element 312 establishes the overshoot pulse width mode control signal. As is known in the art, the mode control signals are decoded in each of the writer-driver bridges 122 to control the write current steady state amplitude and overshoot amplitude in response to the steady-state reference value Iwdc<4:0> and the overshoot reference value Ios<4:0>.

An output signal of the differential delay and overshoot pulse-generation element 312 on the buss 314 comprises the write data signal 104 (augmented by the user data pulses or the synthetic demagnetizing pulses) and a delayed version of the write data signal 104 (also as augmented by the user data pulses or the synthetic demagnetizing pulses). When there is a transition in the write data signal 104, the delay between that transition and a corresponding transition in the delayed write data signal represents the period (i.e., the overshoot period) during which the writer-driver bridges 122 causes the current/voltage to increase to a higher value (as determined by the overshoot write current amplitude reference value Ios<4:0>). The overshoot current/voltage overdrives the transmission line 162 by raising the write current above its steady-state value, thereby improving current rise time in the inductive writer 160.

The differential delay and overshoot pulse-generation element 312 uses a differential delay technique to create the delayed write signal, since delays for successive transitions track each other and thus the composite differential delay is insensitive to fabrication process and temperature variations.

Also, in a preferred embodiment a short overshoot pulse delay is easier to achieve as a difference between two delays than as an absolute delay.

In response to the high-to-low transition 105A (see FIG. 2) in the write gate signal 100, the demagnetizing circuit 116 produces the write gate stretched signal 109 of FIG. 2 and supplies same to AND gates 300 over a conductor 301. The AND gates 300 perform write head selection when one of the head select signals (HS0 to HS3) is asserted. The HS signals arise from a mutually-exclusive decoding of a head select register in the configuration control register 40C of the preamplifier 40. The WG stretched signal is routed to a WG terminal of the selected writer-driver bridge 122, causing the data pulses 103 or the demagnetizing pulses 112 to be supplied to the inductive writer 160 associated with the selected writer-driver bridge 122 via the mode control terminal.

As further illustrated in FIG. 3, the write gate stretched signal 109 is supplied to bias circuits 302 in the differential delay and overshoot pulse-generation element 312 and to bias circuits 303 in the multiplexer 132 to ensure that the bias circuits in these two components are held in a powered-up state throughout the demagnetizing interval 115 (see FIG. 2).

The write gate stretched signal 109 of FIG. 2 is an extended version of the write gate signal 100. In a conventional prior art preamplifier only the write gate signal 100 is present. According to the present invention, the write gate stretched signal 109 is generated within the demagnetizing circuit 116, in response to the write gate signal 100, to hold the preamplifier write circuit block 40B in the write state throughout the demagnetizing interval 115, despite deassertion of the write gate signal 100 at the high-to-low transition 105A.

In response to the write gate stretched signal 109 supplied to the WG terminal (via the asserted AND gate 300) and the mode control signals (i.e., the write data signal and the delayed write data signal further comprising the demagnetizing synthetic pulses 112) supplied to the mode control terminal, during the demagnetizing interval 115 of FIG. 2, steady state write current mirrors and overshoot current transistors (not shown in FIG. 3) in the writer-driver bridge 122 produce a write current comprising a decaying pulse stream 158 (see FIG. 2) having peak pulse magnitudes decreasing with time. This write current is supplied to the inductive writer 160 for demagnetizing the read/write head 14.

During data writing, the mode control signals from the differential delay and overshoot pulse-generation element 312 (i.e., the write data signal and the delayed write data signal further comprising the user data pulses 103) cause data bits to be written to the disc 12. The current mirrors and the overshoot transistors in the writer-driver bridge 122 produce the overshoot current (the pulses 108A in FIG. 2) and the steady state write current 108 in response to the write data pulses, the steady state current amplitude reference value Iwdc<4:0> and the overshoot write current amplitude reference value Ios>4:0≦.

The write current decay profile during the demagnetizing interval 115 of FIG. 2 is controlled by a DAC (digital-to-analog converter), an example of a component for producing a control signal responsive to a predetermined control signal profile, to be described further below, within the demagnetizing circuit 116. The DAC output signals, which are input to the writer-driver bridge 122 via conductors 318, modulate signals within the writer-driver bridge 122 to cause the write current to decay according to a desired decay profile. According to a first embodiment of the present invention, a single DAC in the demagnetizing circuit 116 controls all the writer-driver bridges 122. Other embodiments described below employ additional DACS to control the write current decay profile of a plurality of writer-driver bridges 122.

An exemplary monotonically decaying write current is illustrated in FIG. 2, but the DAC in the demagnetizing circuit 116 can provide other decay profiles. For example, an embodiment of the DAC having unequally scaled current weights permits generation of nonlinear write current decay profiles. In another embodiment, the DAC current weights are selected to produce output signals that compensate for non-linearities in elements of the writer-driver bridge 122 and thus minimize or remove nonlinearities in the write current. Additional flexibility in the write current decay profile is provided by using individually programmable current weights within the DAC, wherein the weights are programmed according to values stored in the preamplifier's configuration control register 40C of FIG. 1.

Figure 4:
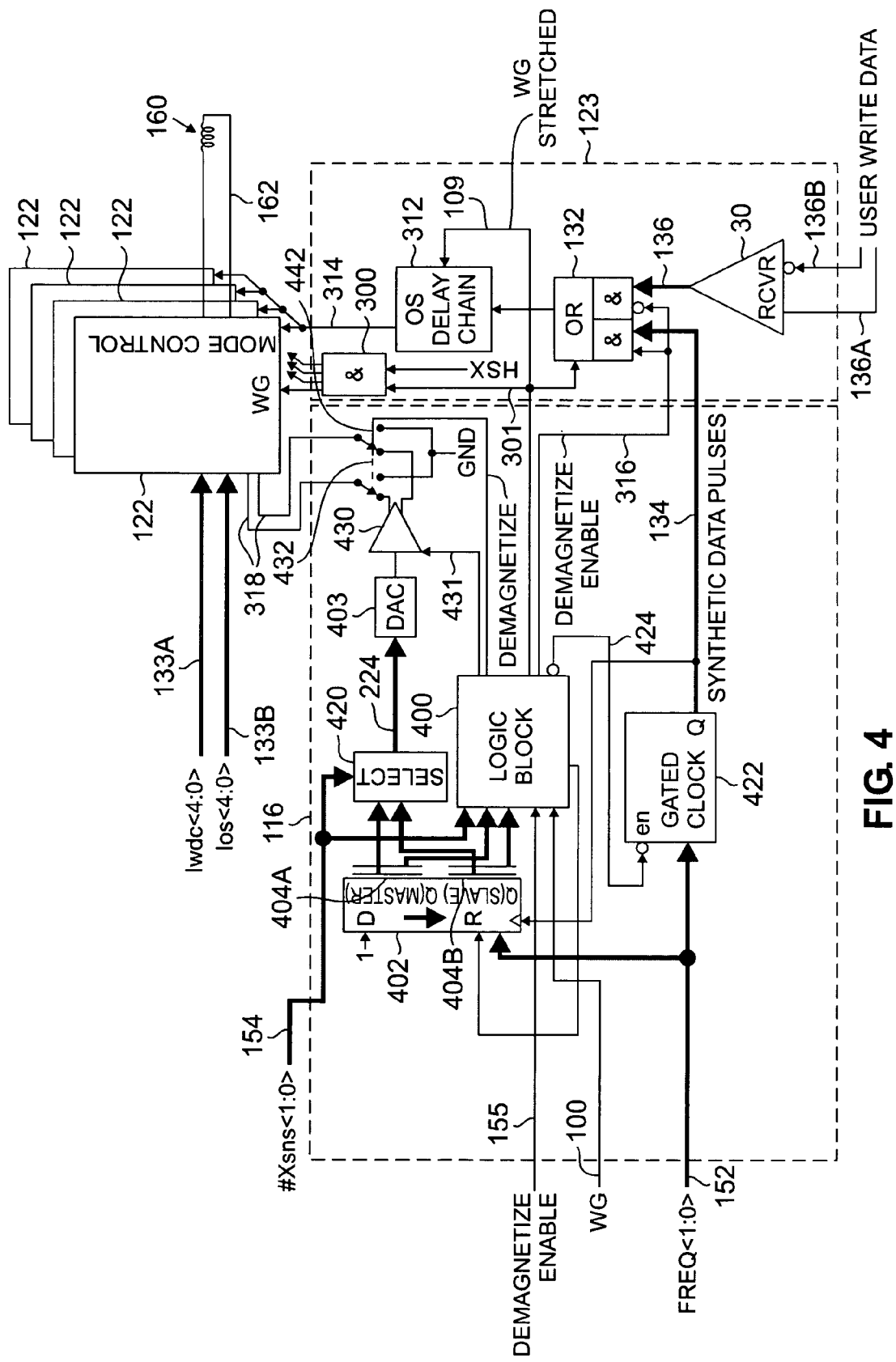
FIG. 4 illustrates certain elements of the demagnetizing apparatus of FIG. 3 in additional detail.
Figure 5A:
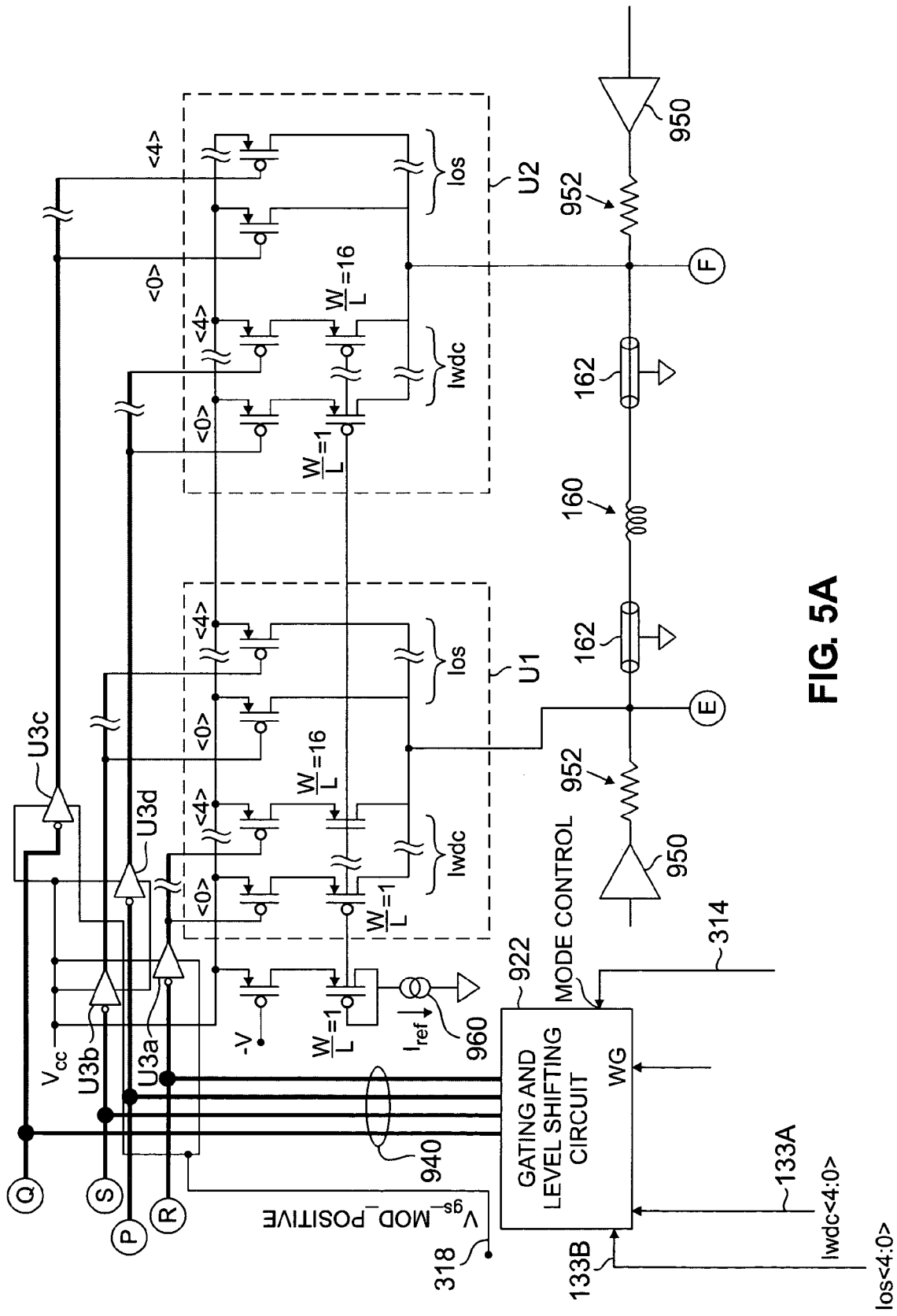
FIGS. 5A and 5B illustrate components of a writer-driver bridge of a disc drive system that are controlled according to a first embodiment of the demagnetizing apparatus of the present invention.
Figure 6:
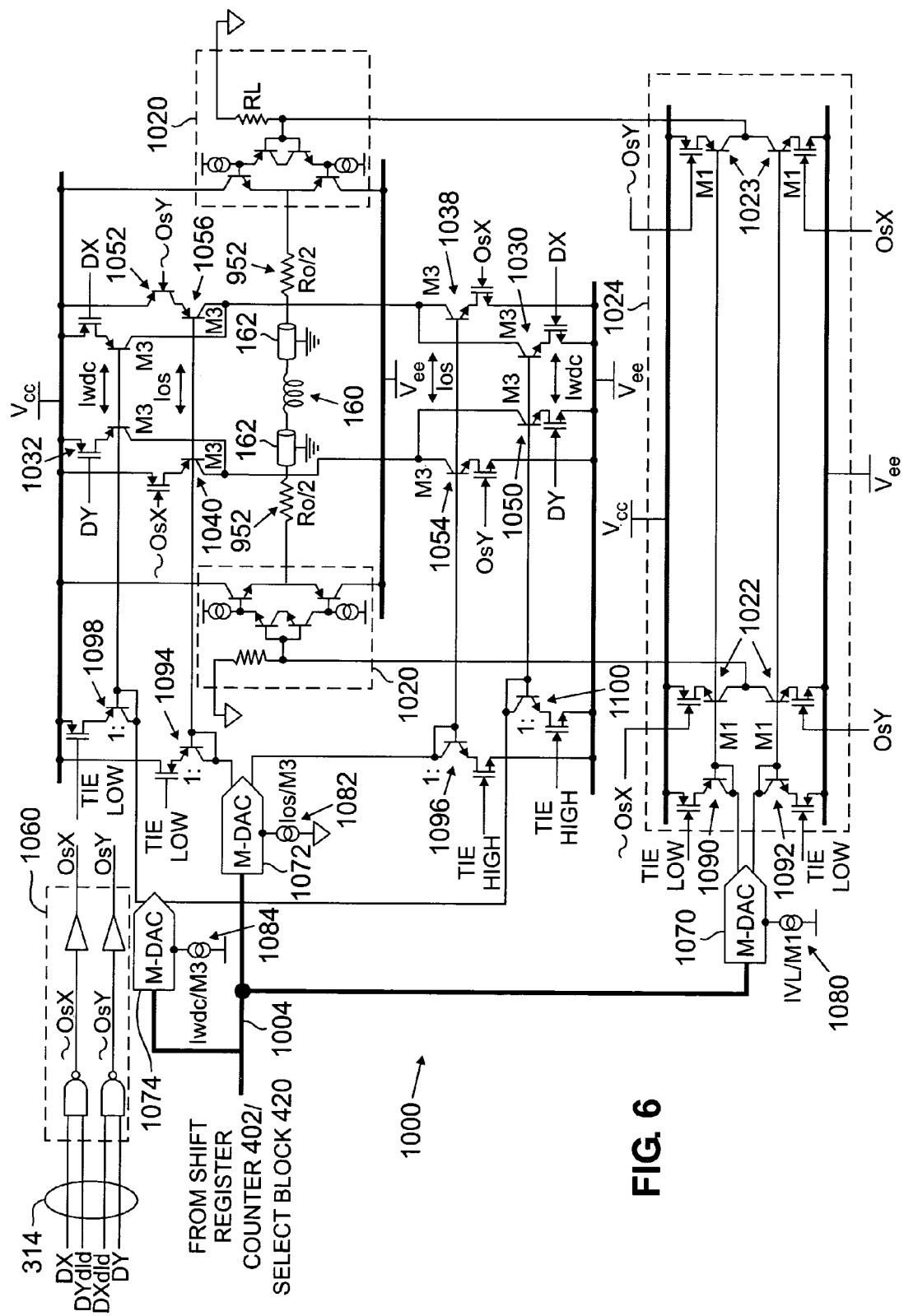
FIG. 6 illustrates components of a writer-driver bridge of a disc drive system that are controlled according to a second embodiment of the demagnetizing apparatus of the present invention.

One embodiment of the present invention, the subject of FIGS. 4 and 5A/5B, is suited primarily to medium-performance writer-driver bridges fabricated using CMOS devices (complimentary metal-oxide semiconductor field effect transistors), wherein die area occupied by the demagnetizing circuit 116 represents a cost and should therefore be minimized. Thus, as illustrated in the embodiment of FIG. 4, a DAC 403 is common to all writer-driver bridges 122 to save chip area. In another embodiment illustrated in FIG. 6, a DAC, such as the DAC 403, is disposed in each of the writer-driver bridges 122. The embodiment of FIG. 6 is typically employed in higher performance writer-driver bridges 122 comprising BiCMOS technology.

FIG. 4 illustrates various components of the demagnetizing circuit 116 according to the teachings of the present invention. Operation of the demagnetizing circuit 116 is enabled by a true value for the demagnetize enable signal on the conductor 155 supplied as an input to a logic block 400. As described above, the demagnetize enable signal originates in the configuration control register 40C of the preamplifier 40 and is enabled by the user when it is desired to perform a demagnetizing operation at the end of each data writing operation.

Upon deassertion of the write gate signal 100 (at the high-to-low transition 105A in the waveform 100 of FIG. 1), and provided the demagnetize enable signal on the conductor 155 is asserted, a signal from the logic block 400 lifts an asynchronous reset (at an R terminal) from a shift register counter 402, which essentially controls the length of the demagnetizing interval 115. In one embodiment, the shift register counter 402 is realized as a tandem connection of seventeen master-slave edge-triggered flip-flops. Both master output terminals 404A (eight in one embodiment) and slave output terminals 404B (eight in one embodiment) of the shift register counter 402 are connected to a select block 420 and the logic block 400. A '1' is propagated through the shift register counter 402 until the count reaches a value as determined by the #Xsns<1:0>, as explained further below.

Because both master and slave outputs are used and the shift register is clocked with a symmetric clock having a period 2T, the shift register produces a sequence of stepwise outputs, with each step being delayed from its predecessor by T seconds (referred to as a 'thermometer code'). Within the demagnetizing circuit 116 of the present invention, this property permits an event time-resolution of T, despite use of a clock (i.e., a gated clock oscillator 422) having period 2T.

In addition to lifting the reset from the shift register counter 402, upon deassertion of the write gate signal 100 and provided the demagnetize enable signal is asserted, the logic block 400 enables the gated clock oscillator 422 (via a signal on a conductor 424) to produce a clock signal train, i.e., the synthetic demagnetizing pulses, on the conductor 134 at a frequency selected by the disc drive user and specified by the value Freq<1:0> on the buss 152. The Freq<1:0> value determines the clock oscillator frequency. In a preferred embodiment, the oscillator frequency (i.e., the demagnetizing pulse frequency) is chosen as one-half the desired demagnetizing frequency because a demagnetizing pulse transition is written on each pulse edge (i.e., the master and slave outputs of the shift register counter 402) that is, assuming that the clock oscillator 422 operates with a 50% duty-cycle.

In one embodiment, it may be desired to gate the clock oscillator 422 on only during the demagnetizing interval, rather than allowing free-running operation. This feature prevents potential noise injection into the preamplifier read circuits 40A during read operations.

As is known to those skilled in the art, the gated clock oscillator 422 can be implemented in numerous embodiments; a preferred realization employs an emitter-coupled logic multivibrator with voltage-swing standardization to stabilize the frequency against bipolar transistor Vbe (base to emitter voltage) variations.

The value #Xsns<1:0> supplied to the demagnetizing circuit 116 on the conductor 154 establishes a number of the synthetic pulses to be inserted during the demagnetizing current ramp down, such that with the specified Freq<1:0> value, the duration of the demagnetizing interval 115 is determined. The #Xsns<1:0> value supplied to the logic block 400 controls a length of the oscillator ON period, i.e., the period during which the gated clock oscillator 422 supplies clock pulses (i.e., the synthetic data pulses) to the multiplexer 132 on the conductor 134.

With the reset lifted by the signal from the logic block 400, the shift register counter 402 counts up from a zero state in response to the clock pulses supplied at a clock terminal, until a synchronous equality comparator within the logic block 400 detects that a current count (representing the ON period) equals the reference value #Xsns<1:0>. During the counting process, in a preferred embodiment, pulses from both the master output terminals 404A and the slave output terminals 404B are counted as they appear in alternating succession. That is, the counted pulses comprise, master0-slave0-master1-slave1, etc. Upon equality detection, the gated clock oscillator 422 is gated off by a signal from the logic block 400 on the conductor 424.

At this point, the demagnetizing interval 115 of FIG. 2 has ended. All logic states are frozen and the write gate stretched signal 109 supplied by the logic block 400 falls to a low state as illustrated in FIG. 2. This transition in the WG stretched signal, which indicates the end of the demagnetizing interval, is seen by the writer-driver bridge 122 at the WG terminal via the AND gates 300.

If head demagnetization following each write operation is not desired, the demagnetize enable signal on the conductor 155 is deasserted low (e.g., false), suppressing operation of the demagnetizing circuit 116. Under this operational scenario, the DAC 403 provides an output signal that permits normal writing operations by the writer-driver bridges 122.

During the demagnetizing sequence, an output signal from the DAC 403 is reduced progressively from a full-scale value to zero (according to a predetermined output signal profile). When supplied to the writer-driver bridges 122, this signal produces the declining amplitude pulses during the demagnetizing interval. Specifically, the DAC output signal controllably modifies the write current amplitude and the overshoot current amplitude produced by the writer-driver bridges 122 by downwardly modulating the steady state write current and the overshoot current (which are based on the Iwdc and Ios reference values) values for normal data writing. See the decaying pulse stream 158 of FIG. 2.

As described below in conjunction with FIGS. 5A, 5B and 6, this output current modulation is accomplished by modulating a gate-to-source voltage (Vgs) of field effect transistors (or CMOS transistors) in the writer-driver bridge 122. By using the DAC output signal to modulate Vgs during the demagnetizing interval, the field effect transistors transition from a hard-on triode operational region through a saturated range of increasingly higher resistance. This causes current supplied to the inductive writer 160 by current sources controlled by the field effect transistors, to decay from the normal write current value to zero during the ramp down interval 107B of FIG. 2.

To control the DAC 403, the select block 420 of FIG. 4 combines and decodes the output signals on the master and the slave busses 404A and 404B of the shift register counter 402, and supplies a signal to the DAC 403 such that the DAC in one embodiment executes a count sequence declining from a code value 11111111 (a preferred full-scale value) to 00000000 (the zero-output value), during the demagnetizing cycle, i.e., the DAC 403 is exercised over its full range for any selected demagnetizing interval length. To eliminate transition energy spikes in the output of the DAC 403, the DAC 403 implements a 'thermometer-code' in which eight input lines progressively switch in response to individual current weights. The thermometer-code implementation permits shaping of the demagnetizing decay profile by appropriately weighting of the DAC current sources, rather than interposing a complex, inflexible, and slow remapping block between the select block 420 and the DAC 403 to achieve a desired decay profile shape. Computation of the current source weights can be accomplished by using a least-squares fit of simulation results from the writer-driver bridge 122, relating a desired demagnetizing decay profile to the modulated Vgs values as determined by the DAC 403. In another embodiment, a digital bit stream is input to the DAC 403 for generating signals to modulate the Vgs values.

Continuing with FIG. 4, the output signal from the DAC 403 is level-shifted and buffered by a buffer amplifier 430 (which is also responsive to a bias signal from the logic block 400 on a conductor 431) and routed through a double-pole double-throw switch 432 (which functions as a multiplexer) to the writer-driver bridges 122 on conductors 318. The signals supplied via the conductors 318 are referred to as Vgs_mod_positive and a Vgs_mod_negative signals.

As will be described further below in conjunction with FIGS. 5A and 5B, within each writer-driver bridge 122 the Vgs_mod_positive and the Vgs_mod_negative signals gate control transistors by setting the transistor's Vgs voltage. The control transistors assume an operational state in response to the applied Vgs value, which operational state determines the steady state write current and the overshoot write current supplied to the inductive writer 160, further in response to the steady-state reference value Iwdc<4:0> and the overshoot reference value Ios<4:0>.

When head demagnetization is disabled, the switch 432 is in a right-hand position in response to a switch control signal supplied on a conductor 442. The conductors 318 are grounded, causing the mode control signals Vgs_mod_positive and Vgs_mod_negative to be at ground potential. A first group of inverters within the writer-driver bridges 122, to be described further below, thereby produce outputs that swing between ground (Vgs_mod_positive) and a supply voltage Vcc. The control transistors responsive the inverters switch between their normal "full conduction" potentials (hard on or off) to produce a write current that writes a one bit or a zero bit to the disc 12.

Similarly, a second group of inverters within the writer-driver bridge 122 have outputs that swing between Vee and Vgs_mod_negative, where Vgs_mod_negative is at ground potential during the data writing interval 105 (see FIG. 3). Thus the control transistors responsive to the second group of inverters operate according to their normal full conduction potentials during the data writing interval 105 (i.e., hard on or off).

Thus during the data writing interval 105 when Vgs_mod_positive and Vgs_mod_negative are both at ground potential, the first and the second groups of inverters in the writer-driver bridge 122 experience maximal output voltage swing, driving their control transistors hard on or off, which is the normal write condition for the writer-driver bridges 122. These voltage swings, will be explained further below in conjunction with the discussion of FIGS. 5A and 5B.

In contrast, during the demagnetizing interval 115, the switch 432 is switched to a left-hand position by the switch control signal on the conductor 442. In this position, the DAC output signals cause the Vgs_mod_positive signal to ramp from ground up to Vcc and the Vgs_mod_negative signal to ramp from ground down to Vee. These ramping currents modulate conduction of the control transistors in the writer-driver bridges 122, causing the write current to decline to toward zero as desired during the ramp down interval 107B of FIG. 2.

Time sequencing of the demagnetizing pulses according to the embodiment of FIG. 4 utilizes the shift register 402 and the gated clock oscillator 422 operating at a frequency of ½T (i.e., referred to as a half rate clock). In another embodiment these elements can be replaced by a binary counter and a clock operating at a frequency of 1/T to control timing.

In yet another embodiment of the invention, the gated clock oscillator 422 can be omitted, while the write data issued by the data write circuit 42C of FIG. 1 provides clocking for the elements of the demagnetizing circuit 116. In this embodiment the data write circuit 42C of FIG. 1 produces post-data transition bursts, i.e., the synthetic pulses, at the desired demagnetizing frequency and of sufficient duration, for input to the multiplexer 132. Such an implementation can simplify the demagnetizing circuit 116 and may provide more precise control of the demagnetizing transition frequency than can be achieved using an on-chip clock oscillator such as the gated clock oscillator 422. Note that alternative demagnetizing implementations that depend on charged-capacitor schemes to produce the demagnetizing current ramp down cannot easily operate in this configuration due to the difficulty of precisely matching ramp timing to write data frequency.

Figure 5B:
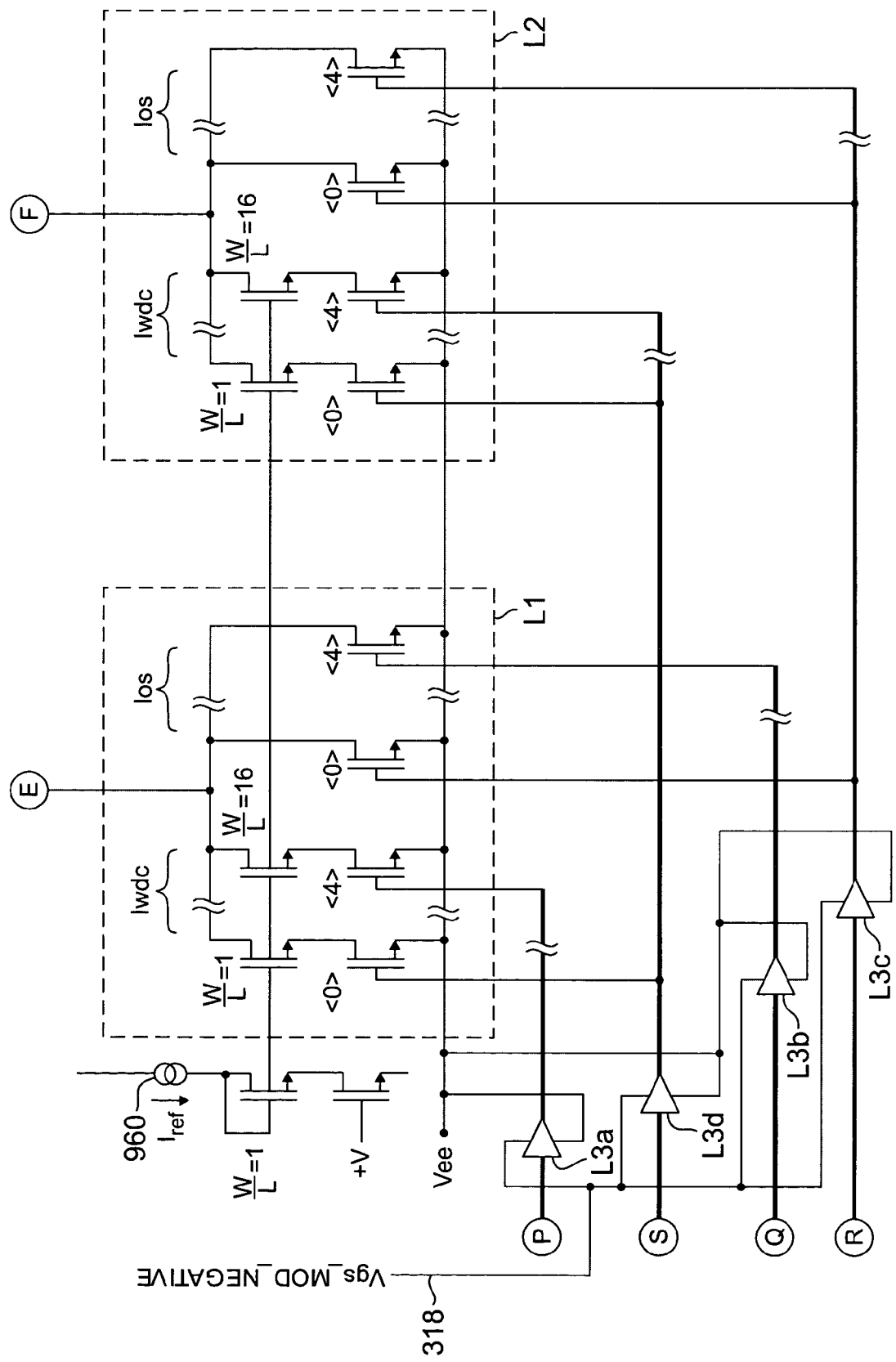

FIGS. 5A and 5B illustrate certain components of the writer-driver bridges 122 that interface with the demagnetizing circuit 116 and the low-level logic circuit block 123. A gating and logic shifting circuit 922 is responsive to the reference value Iwdc<4:0> on the conductor 133A and the reference value Ios<4:0> on the conductor 133B for providing gate control signals on a plurality of busses 940.

Each buffer/driver U3a, U3b, U3c, U3d, L3a, L3b, L3c and L3 is responsive to a plurality of gate control signals present on each one of the plurality of busses 940. The buss output signals from each of the buffer/driver U3a, U3b, U3c, U3d drives or gates steady-state-current control transistors (Iwdc) and overshoot-current control transistors (Ios) (PMOSFETS and NMOSFETS) disposed in blocks U1, U2 as follows.

| | |
|---|---|
| U3a | steady-state-current control transistors (Iwdc) in block U1 |
| U3b | overshoot-current control transistors (Ios) in block U1 |
| U3c | overshoot-current control transistors (Ios) U2 |
| U3d | steady-state-current control transistors (Iwdc) in block U2 |

When driven (enabled), each buss output from each one of the buffers/drivers U3a, U3b, U3c and U3d assumes either a first state value of Vcc or a second state value of Vgs_mod_positive for driving a gate of the associated steady-state-current control transistor or the gate of the associated overshoot-current transistor. The output state (the first state value or the second state value) of each buss output from each one of the buffers/drivers U3a, U3b, U3c and U3d is determined according to the bussed gate control input signals provided to each one of the buffers/drives via the busses 940.

Each buffer/driver L3a, L3b, L3c and L3d has a first state output value of Vee and a second state output value of Vgs_mod_negative. The bussed output state from each of the buffers/drivers is determined according to the bussed buffer/driver input signals on the busses 940 and gates (drives) an associated steady-state-current control transistor (Iwdc) in the blocks L1 and L2 or gates an associated overshoot-current transistor (Ios) in the blocks L1 and L2. The association between the buffers/drivers L3a, L3b, L3c, L3d and the Iwdc and the Ios transistors (PMOSFETS and NMOSFETS) is set forth below:

| | |
|---|---|
| L3a | steady-state-current control transistors (Iwdc) in block L1 |
| L3b | overshoot-current control transistors (Ios) in block L1 |
| L3c | overshoot-current control transistors (Ios) L2 |
| L3d | steady-state-current control transistors (Iwdc) in block L2 |

During the data writing interval 105 of FIG. 2, certain ones of the steady-state-current control transistors and the overshoot-current transistors are gated on hard (and others gated off) to operate as low-resistance switches and supply the desired steady-state write current and write overshoot current to the inductive writer 160. In this mode, the write-driver bridges 122 operate in conventional fashion to write user data to the disc 12 according to the steady-state current and the overshoot current supplied by the steady-state-current control transistors and the overshoot-current transistors.

During the demagnetizing interval 115, certain of the steady-state-current control transistors and the overshoot-current transistors are gated with a varying gate voltage to operate in the triode region and supply the declining demagnetizing current to the inductive writer 160. Both the write current and the overshoot current are modulated toward zero during the demagnetizing interval 115 as illustrated in FIG. 2.

The blocks U1 and U2 are identical, as are the blocks L1 and L2. Each block U1, U2, L1 and L2 comprises a plurality of parallel steady-state-current control transistors (five transistors in the illustrated embodiment providing five-bit write current control), identified in the Figures as Iwdc transistors driven by one of the buffer/drivers, and a like plurality of associated area-ratioed transistors, identified in the Figures by a ratio W/L that represents the relative steady-state current supplied by the area-ratioed transistor to the inductive writer 160 to write a bit to the disc 12. The transistor areas are scaled in binary fashion, permitting the transistors to function as a digital-to-analog controller to control the write current level. Controlling the drive of the Iwdc transistors causes current to be supplied by the associated area-ratioed transistor, such that the total current supplied by the area-ratioed transistors is the desired write or demagnetizing current. The blocks U1 and L2 are operative to supply write current though the inductive writer in a first direction to write a bit of a first state (e.g., a one bit) to the disc 12. The blocks U2 and L1 are operative to supply write current in a second direction to write a bit of a second state (e.g., a zero bit) to the disc 12.

Each block U1, U2, L1 and L2 further comprises a plurality of parallel overshoot-current transistors, identified in the Figures as Ios transistors for supplying the desired overshoot write current to the inductive writer 160. As for the steady-state current transistors, according to the illustrated embodiment, the overshoot current transistors comprise five transistors for providing five-bit overshoot current control, as the transistor areas are binarily weighted. During the overshoot interval, which precedes the write current interval, an overshoot current is supplied to the inductive writer 160 to overdrive the transmission line 162. The overshoot current momentarily raises the write current above its steady-state value to reduce the current rise time in the inductive writer 160. The blocks U1 and L2 are operative to supply overshoot write current though the inductive writer 160 in a first direction when a bit of a first state (e.g., a one bit) is written to the disc 12. The blocks U2 and L1 are operative to supply overshoot current through the inductive writer 160 in a second direction when a bit of a second state (e.g., a zero bit) is written to the disc 12.

In an embodiment having five bit control of the write current and overshoot current amplitudes, each one of the plurality of busses 940 comprises five signal conductors, one conductor for supplying a gate control signal for one of the five steady-state or overshoot transistors. The plurality of busses 940 comprises four busses in one embodiment, one buss for controlling the U1 and L2 steady-state control transistors, one buss for controlling the U1 and L2 overshoot transistors, one buss for controlling the U2 and L2 steady-state control transistors and one buss for controlling the U2 and L2 overshoot transistors. Note that two blocks on opposite legs of the H-bridge operate together to supply current to the inductive writer 160, e.g., the blocks U1 and L2 operate concurrently to supply steady-state and overshoot current in the first direction through the inductive writer 160, and the blocks U2 and L1 operate concurrently to supply steady-state and overshoot current in the second direction through the inductive writer 160. Thus the buffer-drivers U3a, U3b, U3c, U3d, L3a, L3b, L3c and L3d receive bussed input signals and supply bussed output signals.

Note that only the <0> and <4> Iwdc transistors and the <0> and <4> Ios transistors are illustrated in FIGS. 5A and 5B. A break in a line representing conductors connecting the transistor terminals indicates that additional control transistors are present but not shown in FIGS. 5A and 5B. In another embodiment, more or fewer bits can be used to represent the write current values, and accordingly more or fewer than the five parallel transistors would be required in those embodiments. Also, in such an embodiment the Iwdc write current and the Ios overshoot current reference values supplied to the gating and logic shifting circuit 922 would comprise correspondingly more or fewer bits.

As described above in conjunction with FIG. 4, during the data writing interval, the conductors 318 are grounded via the switch 432. In response thereto both the Vgs_mod_positive and Vgs_mod_negative signals are held at ground. During the data writing interval, the buffer/drivers U3a, U3b, U3c and U3d gate of each of the Iwdc and Ios transistors of U1 and U2 to Vcc (for turning the PMOSFET off) or ground (for turning the PMOSFET on hard). Specific transistors are turned off or on in response to the signals on the busses 940, which in turn are responsive to the desired steady-state and overshoot write currents. Similarly, the buffers/drivers L3a, L3b, L3c and L3d gate each of the Iwdc and Ios transistors of L1 and L2 either to Vee (for turning the NMOSFET on hard) or ground (for turning the NMOSFET off).

During the demagnetizing interval the Vgs_mod_positive and Vgs_mod_negative signals are varied, in accordance with the DAC output signal as provided on the conductors 318 through the switch 432, to vary the gate drive and thus control conduction of the Iwdc and Ios transistors to accomplish the write current ramp down illustrated in FIG. 2. Thus, gate drive control for the transistors of U1 and U2 is accomplished by establishing the gate voltage at either Vcc (turning the transistor off) or Vgs_mod_positive (modifying transistor conduction as Vgs_mod_positive is modulated), wherein the control signal on the buss 940 determines whether each transistor is gated by Vcc or Vgs_mod_positive. As the Vgs_mod_positive value changes in accordance with the DAC output, the transistor drive (Vgs) changes and thus the current supplied by the transistor to the inductive writer 160 changes.

Similarly, gate drive control for the transistors of L1 and L2 is accomplished by establishing the gate voltage at either ground (turning the transistor off) or Vgs_mod_negative (modifying transistor conduction as Vgs_mod_negative is modulated), wherein the control signal on the buss 940 determines whether each transistor is gated by ground or Vgs_mod_negative. As the Vgs_mod_negative value changes in accordance with the DAC output, the transistor drive (Vgs) changes and thus the current supplied by the transistor changes.

The MOSFETs of FIGS. 5 and 5B labeled with their W/L areas (i.e., the ratio channel width/channel length) provide current ratioing. These transistors operate as current mirrors where the W/L ratio determines the transistor's current multiplier. The current mirror transistors provide current multiplication, i.e., each current mirror transistor supplies a current equal to a product of the reference current and the transistor's current multiplier. Thus, a transistor having a current multiplier of eight produces a current that is eight times a reference current Iref. For clarity, only the current mirror transistors having ratios of 1 and 16 are illustrated in FIG. 5A and 5B. Generally, the transistor multipliers progress by powers of two: 1, 2, 4, 8 and 16 for the bit positions <0> through <4>, respectively. It is assumed that the W/L ratio of the current reference transistor is 1 as illustrated. In practice, the reference ratio may be higher and thus all transistor ratios would be scaled accordingly.

As can be seen, each current mirror transistor is configured in series with one of the Iwdc control transistors. When the control transistor is gated on, the series current mirror transistor delivers the write current (Iwdc) to the inductive writer 160.

To write a data bit of a first polarity to the disc 12 (see FIG. 1), each signal conductor of the busses 940 is driven high or low by the gating and logic shifting circuit 922 to provide control signals to the upper gate drivers U3a and U3b. The specific buss signals driven high (or low) are determined in response to the Iwdc and Ios reference values supplied to the gating and logic shifting circuit 922 and also in response to the WG signal and the mode control signals on the conductor 314. To generate the proper bit patterns on the busses 940, the gating and logic shifting circuit 922 comprises a plurality of logic elements responsive to the Iwdc and Ios signals input thereto. The logic elements are gated during the appropriate write current interval (the steady state current or the overshoot current interval) to supply the proper bit patterns on the busses 940 to control the upper gate drivers U3a and U3b to gate the appropriate Iwdc and Ios control transistors. Since the mode control signal Vgs_mod_positive is at ground potential during the data writing interval, for the buss signals driven high, the upper gate drivers U3a and U3b provide a level equal to that present on Vgs_mod_positive, hence grounding the corresponding output conductor and grounding the associated control transistor gate to drive the transistor (a PMOSFET) into hard conduction. For the buss signals driven low, the upper gate drivers U3a and U3b supply Vcc on the corresponding output buss to the control transistor gate, turning off the associated transistor.

For example, if the Iwdc reference value is 5 and the Ios reference value is 7, the signals on the busses 940 cause the gate drivers U3a and U3b to gate on the Iwdc control transistors associated with the Iwdc current mirror transistors with a multiplier 1 and a multiplier 4, and to gate on the Ios control transistors with multipliers 1, 2 and 4 to produce the appropriate Ios value. Note that according to the illustrated embodiment, injection of the desired Ios current, by gating on the appropriate Ios transistors, is achieved based on the drain-to-source resistance of the Ios transistors.

To write the data bit of the first polarity, it is also necessary for the lower gate drivers L3c and L3d, in response to signal on the busses 940, to gate the control transistors in the block L2 in response to the Iwdc and Ios reference signals. For those input busses driven high, the lower gate drivers L3c and L3d supply a level equal to the Vgs_mod_negative signal on the output buss to drive the associated transistor (an NMOSFET) into hard conduction. For the buss conductors driven low, the lower gate drivers L3c and L3d force the corresponding output buss to Vee to turn off the associated transistor (an NMOSFET).

A data bit of opposite polarity is written to the disc 12 using the control transistors of the blocks U2 and L1, controlling the buffers/drivers U3c, U3d, L3c and L3d to gate the appropriate control transistors into conduction to provide the Iwdc write current through the associated current mirror transistors and to provide the Ios write current.

During the demagnetizing interval, one or more of the Iwdc and Ios control transistors in the blocks U1 and L2 are gated on while the Iwdc and Ios control transistors in the blocks U2 and L1 are gated off. Then the control transistors of the blocks U1 & L2 are gated off and one or more of the control transistors of the blocks U2 and L1 are gated on. In conjunction with the changing Vgs_mod_positive and Vgs_mod_negative, this process generates the decaying pulse stream 158 of FIG. 2. According to one embodiment, the control transistors gated on during the degaussing interval are the same transistors gated on during the data writing interval. Those skilled in the art recognize that in another embodiment the control transistors gated on during demagnetizing are not identical to the control transistors gated on during data writing.

The demagnetizing current is controlled by gating on the one or more control transistors operative with the current mirror transistors to supply the desired demagnetizing current. However, in contrast to the data writing interval, during the demagnetizing interval the Vgs_mod_positive and Vgs_mod_negative signals are changing under control of the DAC 403, causing the control transistors to be driven incrementally toward cut-off. Recall that during the data writing interval the control transistors are driven either on hard or off. Since the control transistors control the current mirrors, as the former are driven toward cut-off, the current delivered by the current mirrors declines.

For a prior art preamplifier lacking the degaussing capability of the present invention, the Vgs_mod_positive and Vgs_mod_negative signals are hardwired to fixed voltages adequate to assure hard turn on of their associated MOSFETS to produce the Iwdc and Ios currents. There is no decayed write down according to the prior art and thus no need to modulate the conduction of the output stage transistors.

Continuing with FIGS. 5A and 5B, termination drivers 950 and resistors 952, which are known in the art, maintain a proper sending-end impedance termination for the transmission line 930 feeding the inductive writer 160. The resistor value is Ro=Zo/2. The termination drivers 950 are assumed to produce a voltage output (i.e., a low output impedance).

In another embodiment the control transistors in the blocks L1 and L2 comprise PMOSFETS and the control transistors in the blocks U1 and U2 comprise NMOSFETS, with suitable polarity adjustment to the gate driver output signals for driving the transistors.

Although a first implementation of the invention is described in connection with a CMOS writer bridge that varies the write current during degaussing by varying the Vgs of the output drivers of the writer driver bridge 122, the concept of the present invention can also be applied to other CMOS writer bridge implementations, having, as in the presently-described writer-driver bridge 122, area-ratioed output devices to determine the write and overshoot currents. Rather than modulating the voltages of the output devices to accomplish the demagnetize current ramp down, it is possible, in another embodiment, to eliminate the DAC 403 and permit the signals on the buss 224 (see FIG. 4) to control the values on the busses 133A and 133B, via logic that converts the thermometer code on the buss 224 to a binary code that controls the binary weighted output transistors.

According to another embodiment, a current ramp down can be achieved by gating on (and off) different ones of the Iwdc control transistors during the demagnetizing interval 115 of FIG. 2. Transistors are selected to be turned on and off (by signals on the busses 940) according to the area ratio of the current mirror with which the transistor is associated so that the effect of turning transistors on and off causes a decline in the total current supplied as a function of time. For example, at the beginning of the demagnetizing interval only the control transistor assigned bit position <4> is gated on such that the transistor with area ratio 16 provides the output current. Next the control transistors associated with bit positions <0>, <1>, <2> and <3> are gated on while the control transistor for bit position <4> is turned off, producing an output current from the current mirror transistors with a total area ratio of 15. The process of selecting control transistors to produce the declining current continues until the end of the demagnetizing interval. It is not necessary to continuously decrement the supplied current by an area ratio of one, nor is it required to reach an area ratio of one at the end of the demagnetizing interval. In this embodiment, the Vgs_mod_positive and Vgs_mod_negative signals are tied to their 'hard on' values, and the Iwdc and Ios busses are digitally ramped down (i.e., digitally counted down) from the 'normal write' values to effectuate transistor control to produce the write current decay.

Yet another approach suitable for use with relatively slow writer driver bridges 122 employing a common write current DAC to determine the write current, ramps down the input signal to the DAC so that the DAC's output signal correspondingly declines. The reference current sources 960 in FIGS. 5A and 5B are controlled by the DAC output signal In this embodiment, the Vgs_mod_positive and Vgs_mod_negative values are hardwired to ground so that the control transistors are 'hard on.' Thus the write current ramp down during the demagnetizing interval is achieved through the declining Iref values.

FIG. 6 depicts another embodiment of the present invention comprising a high-performance writer driver bridge 1000. Although FIG. 6 illustrates the features of the present invention in a writer driver bridge fabricated according to a complimentary BiCMOS high-speed process, it will be appreciated by those skilled in the art that the teachings are equally applicable to all NPN (and PNP) BiCMOS processes.

As shown in FIG. 6, and in common with the other embodiments, the high-performance writer driver bridge 1000 receives the mode control signals from the Ios delay chain 312 of FIG. 4 over the buss 314, and over an eight-bit buss 1004 receives demagnetize level control inputs originating in the shift register counter 402 and passing through the select block 420. Note that the embodiment described above in conjunction with FIGS. 3, 4, 5A and 5B utilizes a single 'thermometer code' DAC 403 to serve all writer driver bridges 122 of a multi-head writer. The embodiment of FIG. 6 comprises individual DACs in each writer driver bridge (only one high-performance writer driver bridge 1000 is illustrated in FIG. 6). As a result, in this embodiment the eight-bit buss 1004 must be powered to provide a sufficient fan out from the select block 420 before distribution in parallel to all the writer-driver bridges 1000.

The writer-driver bridge 1000 comprises termination drivers 1020 and bipolar driver switched current sources 1022 and 1023 disposed within a terminator voltage switch 1024. These components, which represent one implementation of the termination drivers 950 of FIGS. 5A and 5B, in conjunction with the termination resistors 952 maintain an appropriate sending-end termination for the transmission line 162 feeding the inductive writer 160 to limit the current through the termination resistors 952.

Diagonally opposed high-speed switched current sources or current mirrors 1030 and 1032 switch steady-state write current (Iwdc) directly through the inductive writer 160, without incurring a voltage drop across the termination resistor 952, to write a data bit to the disc 12. Diagonally opposed switched current sources or current mirrors 1038 and 1040 (counterparts to the current sources 1030 and 1032) switch overshoot current (Ios) to the inductive writer 160. Each of the switched current mirrors 1030, 1032, 1038 and 1040 has a symmetric counterpart (1050, 1052, 1054 and 1056) for writing an opposite polarity bit to the disc 12. Each of the current sources 1030, 1032, 1038, 1040, 1050, 1052, 1054 and 1056 supplies current to the inductive writer 160 when the current source's associated control MOSFET is gated on by a control signal DX, DY, OsY, OsX, ~OsY or ~OsX, respectively. With respect to the signals output from OS delay chain 312 in FIG. 4 and the signals depicted in FIG. 2, the control signal DX input to the writer-driver bridge 1000 is the write data signal 104 (augmented by the user data pulses or the synthetic demagnetizing pulses) and a control signal DXdld input to the writer-driver bridge 1000 is a delayed version of the write data signal 104 (also as augmented by the user data pulses or the synthetic demagnetizing pulses). The control signal DY is the complement of the control signal DX, i.e., DY=~DX. The control signal DYdld is the complement of the control signal DXdld, i.e., DYdld =~DXdld.

A logic block 1060 (analogous to the gating and logic shifting circuit 922 in FIGS. 5A and 5B) receives and decodes the mode control signals received from the Ios delay chain 312, producing the control signals OsY, OsX, ~OsY and ~OsX, in response to the mode control signals DX, DY, DXdld and DYdld for gating the MOSFETS in series with the current sources.

Thermometer-coded M-DACS (multiplying DACs) 1070, 1072 and 1074 are each fed by the buss 1004 and by reference current sources 1080, 1082 and 1084, respectively. The denominator M1 or M3 associated with the current sources 1080, 1082 and 1084 indicates the transistor area ratio associated with the current source, as indicated adjacent the controlled transistors. As can be seen, each M-DAC 1070, 1072 and 1074 comprises dual tracking oppositely-poled-current outputs. The M-DAC 1072 supplies the Ios current and the M-DAC 1074 supplies the Iwdc current. In essence, the reference currents 1084 and 1082 represent the Iwdc and Ios reference values, respectively, as the current sources 1084 and 1082 are driven by current-output digital-to-analog converters (not shown) that receive the Iwdc and Ios reference values and convert same to DC reference currents supplied by the reference current sources 1082 and 1084. Assuming the reference current source produces a current I and the buss 1004 carries a value D, then the multiplying DACs 1070, 1072 and 1074 supply an output current of I when D=<11111111> and an output current of 0 when D=<00000000>.

The M-DAC 1070 provide reference current to current sources 1090 and 1092; the M-DAC 1072 provides reference current to current sources 1094 and 1096 for supplying the Ios current to the inductive writer; the M-DAC 1074 provides reference current to current sources 1098 and 1100 for supplying the Iwdc current to the inductive writer. Each of the current sources 1090, 1092, 1094, 1096, 1098 and 1100 is in series with a MOSFET having a gate terminal that is tied to a high or a low voltage to ensure a hard turn-on condition for the MOSFET, and permit the current source to supply current to the current mirrors. These MOSFETS operate to ensure that each current mirror sees the same emitter resistance.

In another embodiment, in lieu of incorporating the M-DACS 1070 and 1072 in each high-performance writer-driver bridge 1000, the M-DACS 1070 and 1072 are disposed in the demagnetizing circuit 116 (as in FIG. 4) for controlling the write current in a plurality of writer driver bridges 122.

The current sources 1090 and 1092 are each mirrored by the switched current mirrors 1022 and 1023. The current sources 1094 and 1096 are mirrored by the switched current mirrors 1040/1056 and 1038/1054, respectively. The current sources 1098 and 1100 are mirrored by the switched current mirrors 1032/1052 and 1030/1050. Although each of the current mirrors is implemented using a bipolar transistor in FIG. 6, in another embodiment MOSFETS can be used in lieu of the bipolar transistors. With the M-DACS 1070, 1072 and 1074 providing modified current references under control of the signals on the buss 1004, the current supplied by switched current mirrors decays during the demagnetize process.

Figure 7:
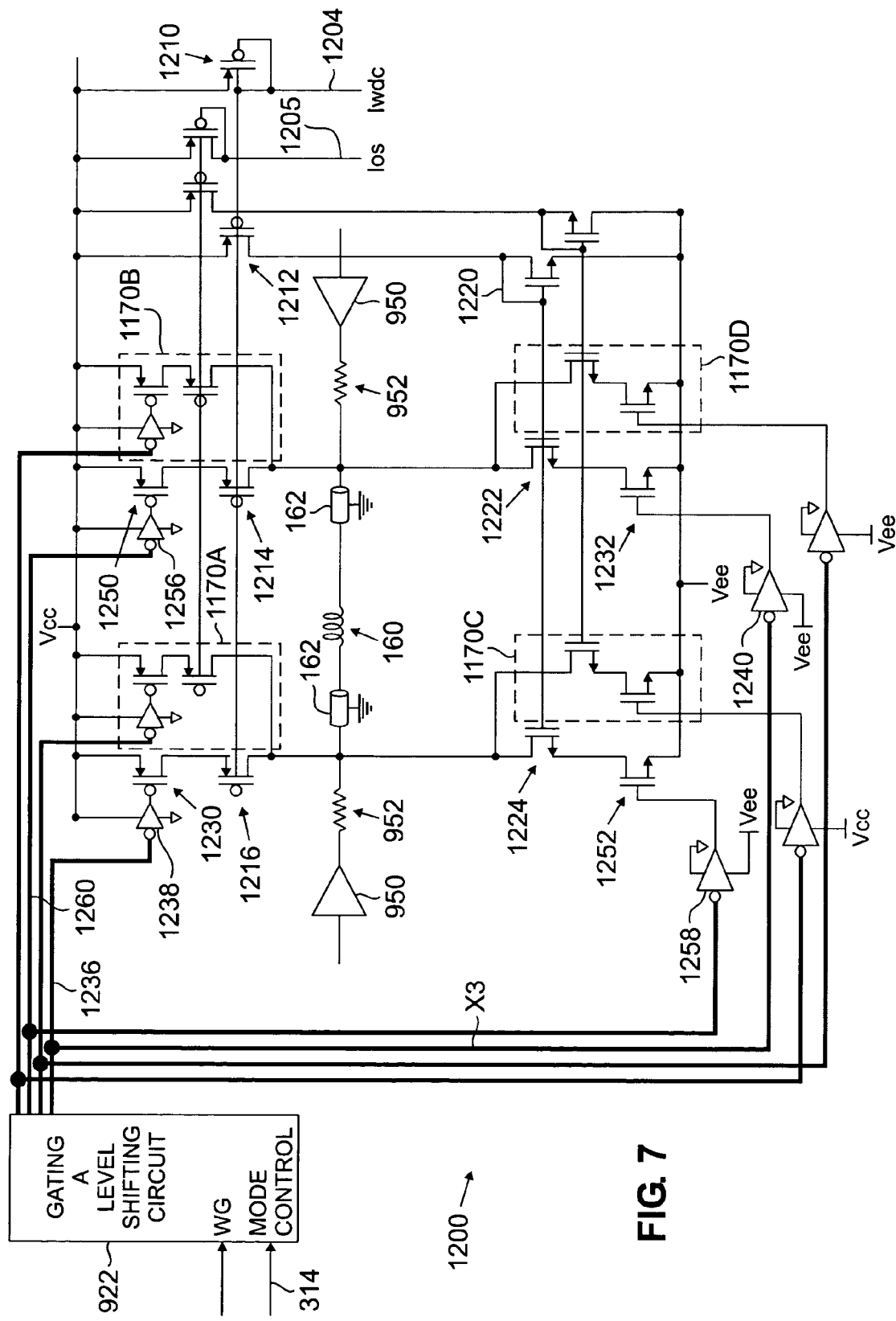
FIGS. 7, 8 and 9 illustrate various techniques for producing a demagnetizing current according to additional embodiments of the present invention.
Figure 8:
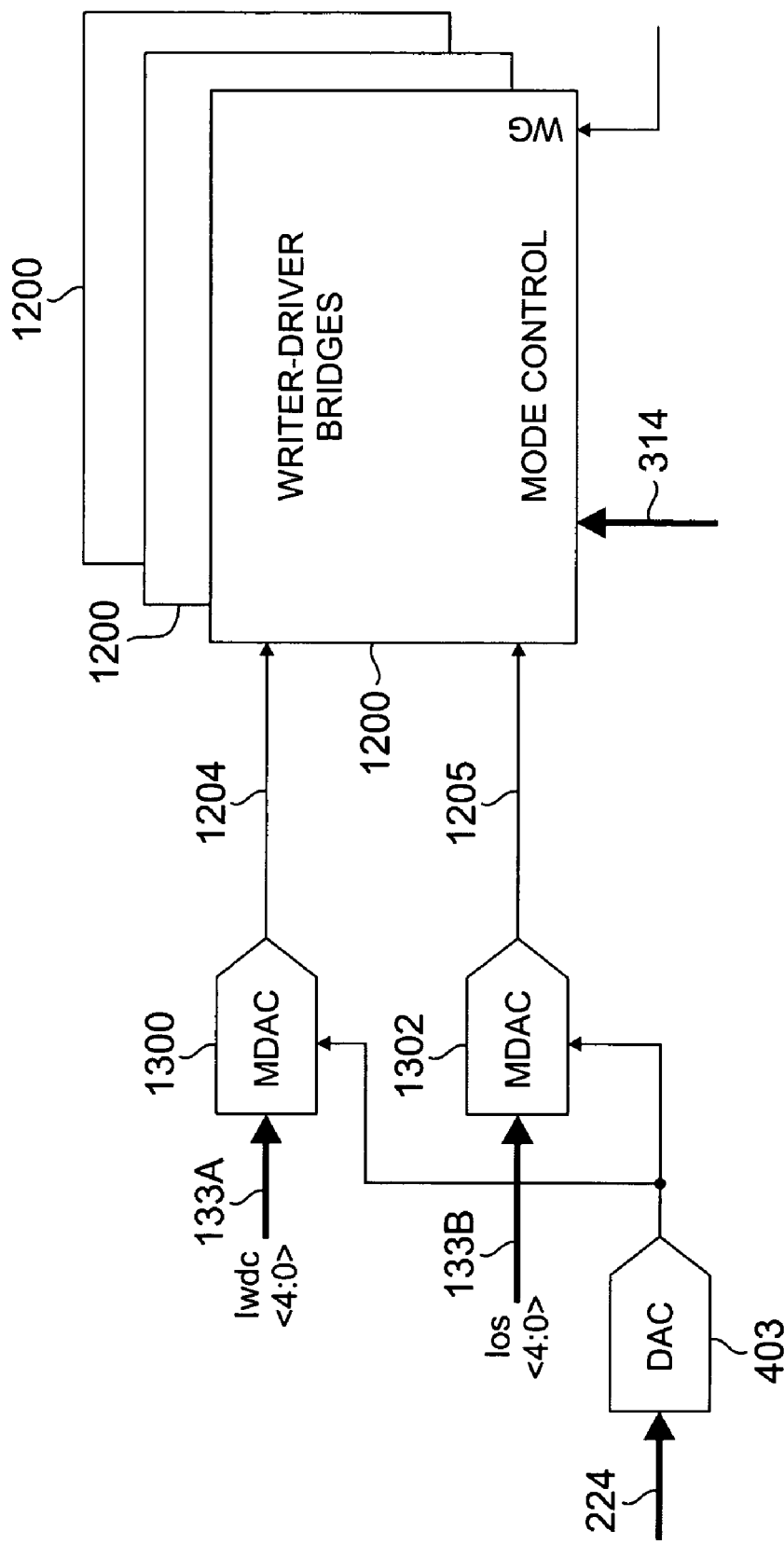

FIGS. 7 and 8 illustrate two other embodiments of the present invention suitable for use with a conventional writer-driver bridge 1200 known in the art and comprising components similar to the writer-driver bridge 122 of FIG. 4, and receiving separate analog reference values Iwdc and Ios (write current and overshoot current) on conductors 1204 and 1205, respectively, for use in determining the write current and the overshoot current supplied by the writer-driver bridge 1200 to the inductive writer 160. The following summary of operation describes the steady state write current path; the overshoot current path functions similarly.

A MOSFET 1210 receives the Iwdc reference value on the conductor 1204 and mirrors the current to PMOSFETS 1212, 1214 and 1216. The PMOSFET 1212 mirrors Iwdc to the lower half of the bridge to NMOSFETS 1220, 1222 and 1224.

During writing of a 'positive' bit, transistors 1230 and 1232 are turned on by a signal on a conductor 1236 from the gating and level shifting circuit 922 through gate buffers/drivers 1238 and 1240, respectively. This causes Iwdc write current to flow from the Vcc rail through the inductive writer 160, in a left-to-right direction, then to the Vee rail.

In a similar fashion, writing of a negative bit entails turning on of diagonally opposed transistors 1250 and 1252, by operation of gate buffers/drivers 1256 and 1258, respectively, in response to a signal on a conductor 1260 from the gating and level shifting circuit 922.

Overshoot current is similarly supplied to the inductive writer 160 through the operation of control and current mirror transistors in each of the overshoot current blocks 1170A, 1170B, 1170C and 1170D, operative in conjunction with a respective buffer/driver (controlled by a control signal supplied by the gating and logic shifting circuit 922) and a control MOSFET responsive to the buffer/driver signal.

Unlike the embodiment of FIGS. 5A and 5B where the magnitude of the write current is established within the writer-driver bridge 122, in the embodiment of FIG. 7, the write current magnitude (both the steady state write current and the overshoot write current) is determined by a current intensity supplied on the conductors 1024 and 1025, i.e., the Iwdc and Ios reference values. Also note that contrary to the embodiment of FIGS. 5A and 5B, the gate drivers (1256 and 1258, for example) are hardwired to Vcc, ground, and Vee, as appropriate, thereby ensuring hard turn on and turn off of the driven MOSFETS.

FIG. 8 illustrates one circuit embodiment for modifying the Iwdc and Ios reference current values during the demagnetizing interval 115 of FIG. 2, for use with the writer-driver bridge 1200 of FIG. 7. As in the FIG. 4 embodiment, the DAC 403 produces an output current ramp that falls from full scale (as used during the normal write mode) down to zero (during the demagnetizing interval 115) in response to count signals on the buss 224. The current ramp is applied as a reference current to multiplying DACS 1300 and 1302, which also receive the Iwdc and Ios reference values over the busses 133A and 133B, respectively. As a result, the reference currents delivered on the conductors 1204 and 1205 from the multiplying DACS 1300 and 1302 to writer-driver bridges 1200 decline over the demagnetizing interval 115 from their initial value to zero, thus accomplishing head demagnetization.

Figure 9:
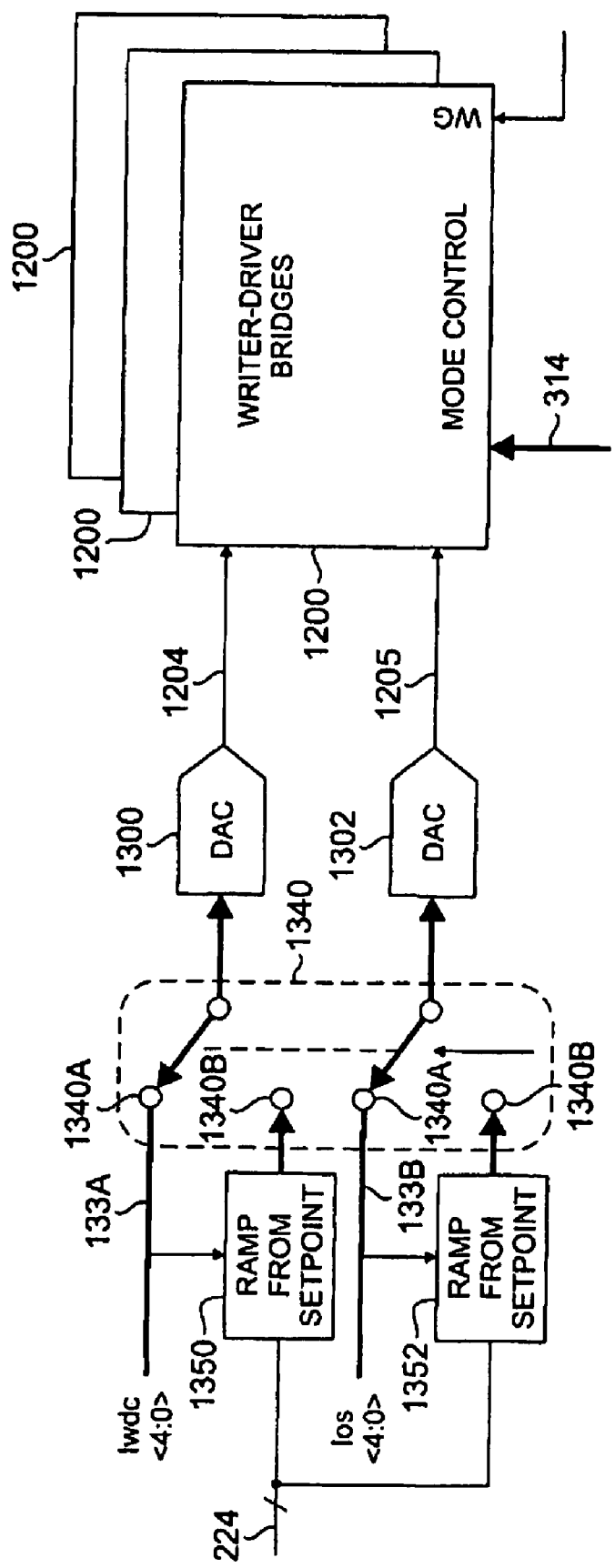

FIG. 9 illustrates another demagnetization implementation according to the teachings of the present invention for use with the writer-driver bridge 1200, wherein the write current ramp down is achieved digitally, rather than as in FIG. 8 through analog modulation of the Iwdc and Ios reference current values supplied to the multiplying DACS 1300 and 1302. According to the FIG. 9 embodiment, the DACS 1300 and 1302 receive the reference current values Iwdc and Ios through busses 133A and 133B, respectively. Ramp down of the reference values Iwdc and Ios during the demagnetizing interval is performed by modulating the digital inputs to the respective DAC. In a no ramp (i.e., during a data write operation) a position 1340A of a switch 1340 passes the fixed reference currents Iwdc <4:0> and Ios <4:0> directly to the DACS 1300 and 1302. Accordingly, the reference currents on the conductors 1310 and 1312 are set as appropriate for normal data writing operations.

In a demagnetize position 1340B of the switch 1340, the DACS 1300 and 1302 receive an input signal from ramp set point logic blocks 1350 and 1352, respectively. The block 1350 receives inputs from the Iwdc<4:0> buss 133A and from the select block 420 of FIG. 4 over the buss 224. The block 1350 multiplies and normalizes the Iwdc reference input in response to the degauss-amplitude input received on the buss 224 according to the equation:

Output signal from block 1350=(actual state of buss 224/number of states available on buss 224−1)* (value on buss 133B)

The block 1352 performs a similar operation relative to the Ios reference value. Supplying the ramping Iwdc and Ios reference values to the writer driver bridge 1320 causes the desired write current decay during the demagnetizing interval.

According to another embodiment, to increase resolution of the degauss ramp down, it may be advantageous for the DACs 1300 and 1302 to have a higher resolution than that strictly required (5 bits) by the width of the busses 133A and 133B.

An architecture and process have been described as useful for demagnetizing a write head of a disc drive. Specific applications and exemplary embodiments of the invention have been illustrated and discussed, which provide a basis for practicing the invention in a variety of ways and in a variety of circuit structures. Numerous variations are possible within the scope of the invention. Features and elements associated with one or more of the described embodiments are not to be construed as required elements for all embodiments. The invention is limited only by the claims that follow.

What is claimed is:

1. An apparatus for demagnetizing a disc drive head, comprising:
    an oscillator for producing a series of pulses;
    a counter control circuit having a counter for determining a demagnetizing interval in response to clock control signals indicating a pulse duration and a number of pulses to be counted by the counter, the pulses modulating a demagnetizing current when the demagnetizing current is supplied to the head; and
    a writer-driver for producing the demagnetizing current in response to a control signal wherein the pulses modulate the demagnetizing current to demagnetize the head,
    the counter control circuit comprising a component for producing the control signal responsive to a predetermined control signal profile, wherein the control signal controls the writer-driver to cause the demagnetizing current to decrease with time.

2. The apparatus of claim 1 wherein the counter control circuit for determining the demagnetizing interval comprises a shift register counter for producing count values during the demagnetizing interval in response to the series of pulses having a period of 2T, and wherein the count values are generated from a plurality of pulses each having a pulse duration of T.

3. The apparatus of claim 2 wherein the shift register counter comprises a plurality of master output terminals and a plurality of slave output terminals, producing a sequence of stepwise outputs, with each step being delayed from its predecessor by the pulse duration T.

4. The apparatus of claim 3 wherein the control signal is produced in response to binary values applied to a digital-to-analog converter in response to the sequence of stepwise outputs.

5. The apparatus of claim 4 wherein the binary values are generated according to one of a thermometer code or a binary code.

6. The apparatus of claim 3 wherein the component comprises conversion logic that converts the sequence of stepwise outputs to a binary code utilized as the control signal.

7. The apparatus of claim 1 further comprising a demagnetizing enable signal for enabling demagnetizing of the disc drive head.

8. The apparatus of claim 1 wherein the head further comprises an inductive writer for writing data to a disc storage medium in response to a write current supplied during a data writing interval, and wherein the writer-driver produces the write current and the demagnetizing current, and wherein during the data writing interval the writer-driver is responsive to a write gate signal and supplies the write current to the inductive writer, and wherein during the demagnetizing interval the writer-driver is responsive to a write gate stretched signal and supplies the demagnetizing current to the inductive writer.

9. The apparatus of claim 1 wherein the oscillator is a controllable oscillator responsive to a frequency value for indicating a frequency of the pulses.

10. The apparatus of claim 1 wherein the predetermined control signal profile comprises a linear or nonlinear profile.

11. The apparatus of claim 1 wherein the disk drive head comprises an inductive writer for receiving write current for writing data to the disc drive during a data writing interval and for receiving demagnetizing current for demagnetizing the head during a demagnetizing interval,
   the writer-driver is a writer-driver bridge for producing the write current and the demagnetizing current, and
   the component is a digital-to-analog converter producing the control signal supplied to the writer-driver bridge for causing the demagnetizing current to decrease with time.

12. The apparatus of claim 11 wherein the digital-to-analog converter comprises a plurality of current weight elements, and wherein the control signal is responsive to selected current weights from the plurality of current weight elements.

13. The apparatus of claim 12 wherein the plurality of current weight elements comprise unequally scaled current weights.

14. The apparatus of claim 12 wherein the current weight elements are selected from the plurality of current weight elements to minimize nonlinear effects in the demagnetizing current.

15. The apparatus of claim 11 wherein the writer-driver bridge comprises complimentary metal-oxide semiconductor field effect transistor circuits or comprises bipolar junction transistor circuits.

16. The apparatus of claim 11 wherein the writer-driver bridge comprises a plurality of field effect transistors for producing the demagnetizing current, and wherein the control signal comprises a gate drive signal for controlling the plurality of field effect transistors to produce the demagnetizing current.

17. The apparatus of claim 16 wherein the demagnetizing current comprises a steady state demagnetizing current and an overshoot demagnetizing current, wherein the control signal gates the plurality of field effect transistors to produce the steady state demagnetizing current and the overshoot demagnetizing current.

18. The apparatus of claim 17 wherein the control signal gates first ones of the plurality of field effect transistors to cause the steady state demagnetizing current to decrease from a reference value to substantially zero during the demagnetizing interval, and wherein the control signal gates second ones of the plurality of the field effect transistors to cause the overshoot demagnetizing current to decrease during the demagnetizing interval.

19. The apparatus of claim 17 wherein a resistance of each one of the plurality of field effect transistors is responsive to the control signal causing the steady state demagnetizing current and the overshoot demagnetizing current to decrease during the demagnetizing interval.

20. The apparatus of claim 16 wherein the control signal is selected to control the plurality of field effect transistors to cause the demagnetizing current to decline with time during the demagnetizing interval and a constant voltage is selected to maintain the write current at a substantially constant value during the data writing interval.

21. The apparatus of claim 16 wherein the gate drive signal comprises a voltage Vgs.

22. The apparatus of claim 1 wherein the oscillator, the counter control circuit, and the writer-driver for producing demagnetizing current are disposed in a preamplifier of a disc drive system further comprising the disc drive head.

23. The apparatus of claim 1 further comprises:
   a multiplexer which receives write data pulses to be selected for writing to a disc drive during a data writing interval and the series of pulses to be selected for head demagnetizing during the demagnetizing interval.

24. The apparatus of claim 23 further comprising a logic circuit for receiving a write gate signal defining the data writing interval, wherein the disc drive head writes data to a disc storage medium during the data writing interval, and for producing a write gate stretched signal in response to the write gate signal, and wherein the write gate stretched signal delineates the demagnetizing interval extending beyond the data writing interval, and wherein the pulses produced by the oscillator modulate the demagnetizing current supplied to the disc drive head during the demagnetizing interval.

25. The apparatus of claim 24 wherein the logic circuit inserts a delay interval between the data writing interval and the demagnetizing interval.

26. The apparatus of claim 1 wherein the counter control circuit for determining the demagnetizing interval length comprises a shift register counter for producing count values until a count value is reached that equals a reference count value representing the demagnetizing interval in response to the series of pulses, and wherein the count value is derived from a stream of the-pulses with each pulse having a first pulse duration and wherein the series of pulses produced by the oscillator have a period that is a multiple of the first pulse duration.

27. The apparatus of claim 26 wherein the multiple comprises two.

28. The apparatus of claim 1 wherein the demagnetizing current extends between a positive peak value and a negative peak value, and wherein a magnitude of the positive peak substantially equals a magnitude of the negative peak, and wherein with time the positive peak values and the negative peak values approach zero as the demagnetizing current declines.

29. The apparatus of claim 1 wherein the oscillator is on only when the demagnetizing current is supplied to the head.

30. The apparatus of claim 1 wherein the control signal profile comprises a profile that linearly or nonlinearly declines with time.

31. The apparatus of claim 1 wherein the component comprises a digital-to analog converter for producing the control signal according to a thermometer code.

32. The apparatus of claim 1 wherein the demagnetizing current comprises a plurality of pulses alternating between a positive pulse peak and a negative pulse peak, and wherein the positive pulse peak and the negative pulse peak approach zero as the demagnetizing current decreases with time.

33. The apparatus of claim 1 wherein a magnitude of the demagnetizing current is determined according to selected ones of a plurality of current sources, and wherein the current sources are selected to cause the demagnetizing current to decrease with time.

34. A disc drive for writing data bits to a storage medium, comprising:
an oscillator for producing clock pulses having a period 2T;
a counter for receiving the clock pulses and in response thereto producing count values on a plurality of master output terminals and on a plurality of slave output terminals, wherein as the counter counts the clock pulses the count values change every period T until reaching a final count value;
a multiplexer responsive to the clock pulses and to data pulses for producing a write data signal modulated by the clock pulses during a demagnetizing interval and modulated by the data pulses during a data writing interval;
a digital-to-analog converter responsive to the count values for producing an output signal that changes with time during the demagnetizing interval;
a switch that selects the output signal as a control signal during the demagnetizing interval and that selects a voltage that remains substantially constant as the control signal during the data writing interval;
a plurality of steady state current transistors each having an operating state responsive to the control signal and each for controlling one of a like plurality of current mirrors, and wherein each current mirror presents a different area ratio for supplying a different current to a write head, and wherein during the data writing interval certain ones of the plurality of steady state current transistors, responsive to the control signal, cause current to be supplied from the associated current mirrors to the write head in a first direction to write a bit of a first polarity to the storage medium, and wherein during the data writing interval other ones of the plurality of steady state current transistors, responsive to the control signal, cause current to be supplied from the associated current mirrors to the write head in a second direction to write a bit of a second polarity to the storage medium, and wherein during the data writing interval the operating state of the plurality of steady state control transistors is either substantially on or substantially off, and wherein during the demagnetizing interval the operating state of the plurality of steady state current transistors varies as controlled by the control signal; and
a plurality of overshoot current transistors each having an operating state responsive to the control signal, wherein during the data writing interval certain ones of the plurality of overshoot current transistors are controlled to supply current to the write head in a first direction, and wherein during the data writing interval other ones of the plurality of overshoot current transistors are controlled to supply current to the write head in a second direction, and wherein during the demagnetizing interval the operating state of the overshoot current transistors varies as controlled by the control signal.

35. The disc drive of claim 34 wherein the selection of the clock pulses or the data pulses is synchronized.

36. The disc drive of claim 34 wherein the control signal comprises a gate drive signal for controlling the plurality of steady state current transistors and the plurality of overshoot current transistors.

37. The disc drive of claim 34 wherein the control signal changes with time according to a thermometer code during the demagnetizing interval.

38. The disc drive of claim 34 further comprising a plurality of buffers/drivers, wherein each one of the plurality of buffers/drivers is controlled to produce an output signal having a first state or a second state by an input signal responsive to a steady state current reference value or by an input signal responsive to an overshoot current reference value, wherein a magnitude of the output signal of the first state is determined by the control signal, and wherein the output signal from each one of the plurality of buffers/drivers controls the operating state of one of the plurality of steady state current transistors or one of the plurality of overshoot current transistors.

39. The disc drive of claim 34 wherein the oscillator produces the clock pulses in response to a signal indicating a frequency or a period of the clock pulses.

40. An apparatus for demagnetizing a plurality of disc drive heads, comprising:
an oscillator for producing pulses;
a register for producing a count value in response to the pulses;
a digital-to-analog converter responsive to the count value for producing a control signal having a value that changes with time;
a current source for producing demagnetizing current in response to the control signal,
wherein the demagnetizing current decreases with time in response to the control signal; and
wherein the pulses modulate the demagnetizing current to demagnetize the head.

41. The apparatus of claim 39 further comprising a plurality of digital-to-analog converters equal in number to the plurality of disc drive heads.

42. An apparatus for demagnetizing a disc drive head of a data storage system, comprising:
an oscillator for producing synthetic data pulses for demagnetizing the head;
a shift register counter for producing varying count values until a specified count value is reached in response to the synthetic data pulses; and
a writer-driver for producing demagnetizing current in response to the varying count values, wherein the demagnetizing current decreases with time and wherein the synthetic data pulses modulate the demagnetizing current to demagnetize the head.

43. The apparatus of claim 42 further comprising:
a digital-to-analog converter having programmable current weights for producing in response to the varying count values a programmable write current decay profile coupled to the writer-driver wherein the synthetic data pulses are synchronized to changes in the varying count values.

44. A method for demagnetizing a write head of a magnetic data storage system, comprising:
producing demagnetizing pulses for demagnetizing the write head;
converting an output signal from a counter controlled by a digital value representing a number of pulses to be inserted during a demagnetizing interval to a control signal according to a predetermined control signal profile;
producing a demagnetizing current in response to the control signal, wherein the demagnetizing current decreases with time;
modulating the demagnetizing current by the demagnetizing pulses; and
supplying the modulated demagnetizing current to the write head to demagnetize the write head.

45. The method of claim 44 wherein the step of producing the demagnetizing pulses further comprises enabling a clock oscillator to produce the demagnetizing pulses during the demagnetizing interval.

46. The method of claim 44 wherein the step of converting the output signal comprises generating the output signal according to a thermometer code.

47. The method of claim 44 wherein the control signal controls an operating condition of a plurality of transistors that supply the demagnetizing current to the write head.

48. The method of claim 47 wherein the operating condition comprises a degree to which each one of the plurality of transistors is turned on to control the magnitude of the demagnetizing current supplied to the write head.

49. The method of claim 47 wherein each one of the plurality of transistors supplies a different current magnitude to the write head, and wherein in response to the control signal certain ones of the plurality of transistors are selected to supply the demagnetizing current to the write head, and wherein with time different ones of the plurality of transistors are selected to achieve the demagnetizing current decreasing with time.

* * * * *